(12) United States Patent
Jeter

(10) Patent No.: US 9,932,970 B1
(45) Date of Patent: Apr. 3, 2018

(54) HYBRID THERMAL POWER AND DESALINATION APPARATUS AND METHODS

(71) Applicant: Donald W Jeter, Bellingham, WA (US)

(72) Inventor: Donald W Jeter, Bellingham, WA (US)

( * ) Notice: Subject to any disclaimer, the term of this patent is extended or adjusted under 35 U.S.C. 154(b) by 0 days.

(21) Appl. No.: 15/831,356

(22) Filed: Dec. 4, 2017

Related U.S. Application Data

(63) Continuation-in-part of application No. 14/247,226, filed on Apr. 7, 2014.

(60) Provisional application No. 61/809,398, filed on Apr. 7, 2013.

(51) Int. Cl.
| | | |
|---|---|---|
| *F03G 7/04* | (2006.01) | |
| *C02F 1/16* | (2006.01) | |
| *F01K 19/00* | (2006.01) | |
| *F01K 25/08* | (2006.01) | |

(52) U.S. Cl.
CPC ............. *F03G 7/04* (2013.01); *F01K 19/00* (2013.01); *F01K 25/08* (2013.01); *Y02E 10/10* (2013.01)

(58) Field of Classification Search
CPC ... F03G 7/04; F03G 6/00; F03G 6/003; F03G 6/06; F03G 6/065; F03G 6/008; F03G 2006/008; C02F 1/14; C02F 1/16; Y02E 10/10–10/18; Y02E 10/40–10/46; Y02E 10/465
USPC ............. 60/641.1–641.6, 641.8–641.15
See application file for complete search history.

(56) References Cited

U.S. PATENT DOCUMENTS

| | | | | |
|---|---|---|---|---|
| 3,769,781 A | * | 11/1973 | Klein | F22B 37/327 96/372 |
| 3,936,652 A | * | 2/1976 | Levine | F03D 9/00 261/DIG. 11 |
| 4,080,186 A | * | 3/1978 | Ockert | B01D 45/16 55/438 |
| 2003/0201646 A1 | * | 10/2003 | Kaploun | H02K 7/183 290/54 |
| 2005/0150225 A1 | * | 7/2005 | Gwiazda | F03D 1/04 60/641.1 |

(Continued)

FOREIGN PATENT DOCUMENTS

| | | | | |
|---|---|---|---|---|
| CN | 101671056 A | * | 3/2010 | |
| DE | 10102675 A1 | * | 7/2002 | F03D 1/04 |

*Primary Examiner* — Mark Laurenzi
*Assistant Examiner* — Mickey France
(74) *Attorney, Agent, or Firm* — Kal K Lambert; Lambert Patent Srvs

(57) ABSTRACT

Rankine Cycle power generation facility having a plurality of thermal inputs and at least one heat sink, where the heat sink includes a thermal chimney or a natural convective cooling tower. In a preferred embodiment, the power facility generates electricity and/or fresh water with a zero carbon footprint, such as by using a combination of solar and geothermal heating to drive a Rankine Cycle heat engine. In one embodiment, a thermal stack is mounted in the base of the thermal chimney, the thermal stack for using waste heat from the plurality of thermal inputs to drive a natural convective flow of air in the thermal chimney, the convective flow having sufficient momentum to drive additional power generation in an air turbine mounted in the chimney and to drive an evaporative cycle for concentratively extracting fresh water from geothermal brines.

19 Claims, 23 Drawing Sheets

(56) References Cited

U.S. PATENT DOCUMENTS

| | | | | |
|---|---|---|---|---|
| 2006/0137349 A1* | 6/2006 | Pflanz | ...................... | F03G 6/06 |
| | | | | 60/641.2 |
| 2006/0156725 A1* | 7/2006 | Kenessey | .................. | F03D 1/04 |
| | | | | 60/641.12 |
| 2010/0031654 A1* | 2/2010 | Barbero Ferrandiz | . | F03D 9/007 |
| | | | | 60/641.8 |
| 2010/0199668 A1* | 8/2010 | Coustou | ................... | F03D 1/04 |
| | | | | 60/641.8 |
| 2010/0278629 A1* | 11/2010 | Krippene | ................. | F03D 1/04 |
| | | | | 415/1 |
| 2011/0021134 A1* | 1/2011 | Zwern | ...................... | C02F 1/04 |
| | | | | 454/343 |
| 2012/0138447 A1* | 6/2012 | Glynn | .................. | B01D 1/0035 |
| | | | | 202/189 |

\* cited by examiner

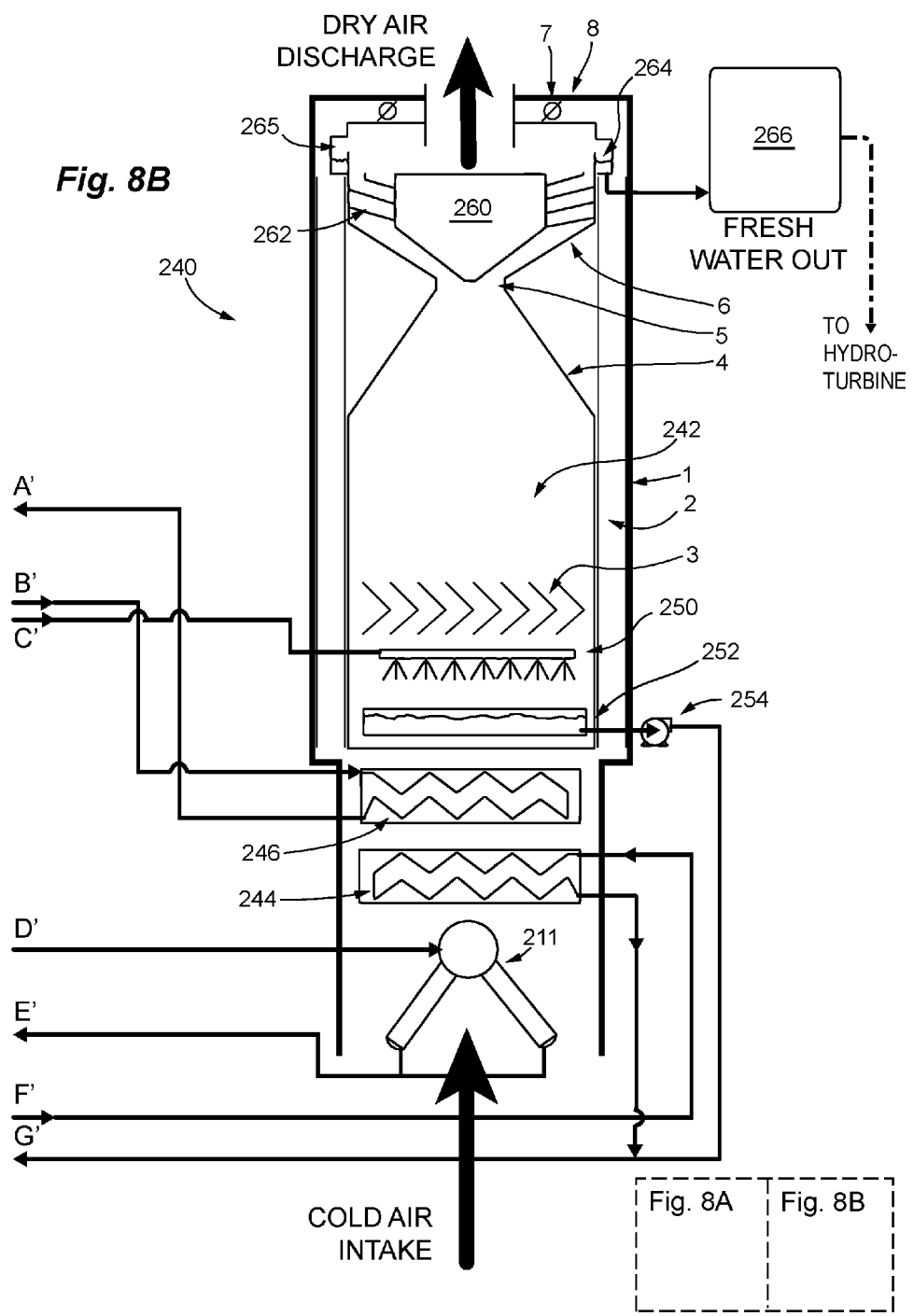

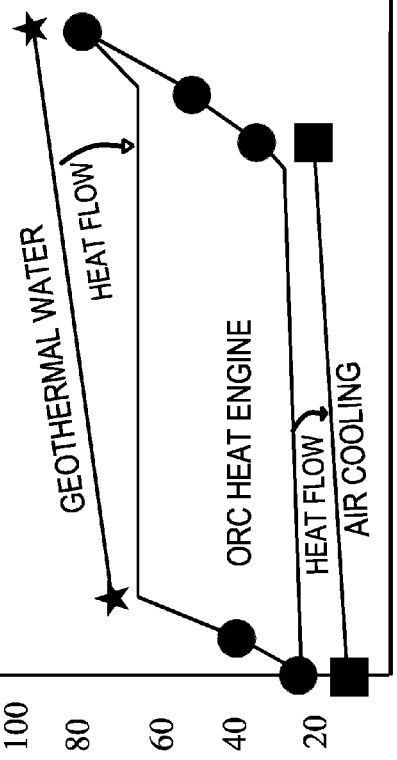

BASE CASE WITH BOOST

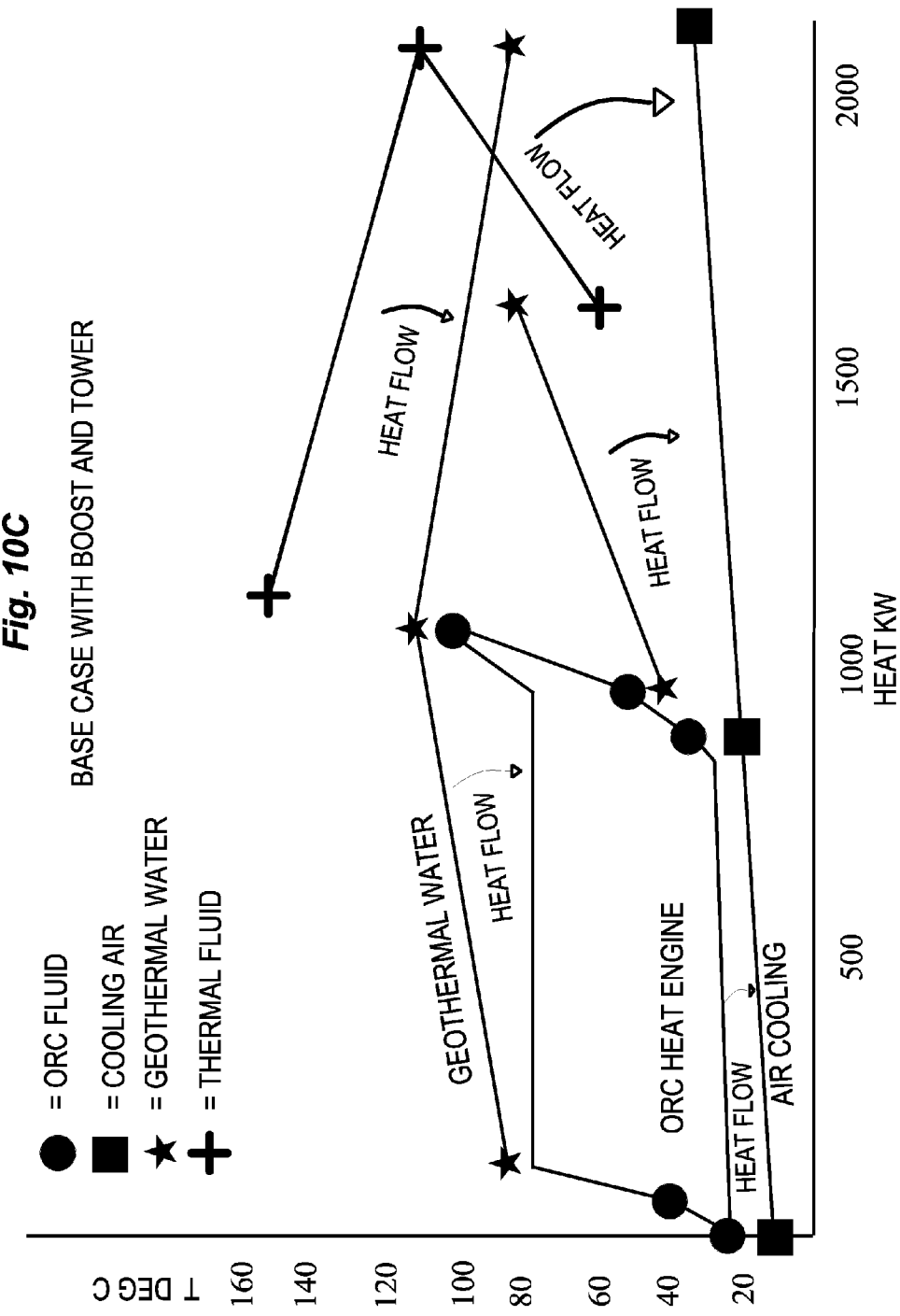

POTENTIAL BOOST EFFECTS OF SOLAR AND IMPROVED COOLING

POTENTIAL BOOST EFFECTS OF SOLAR AND IMPROVED COOLING

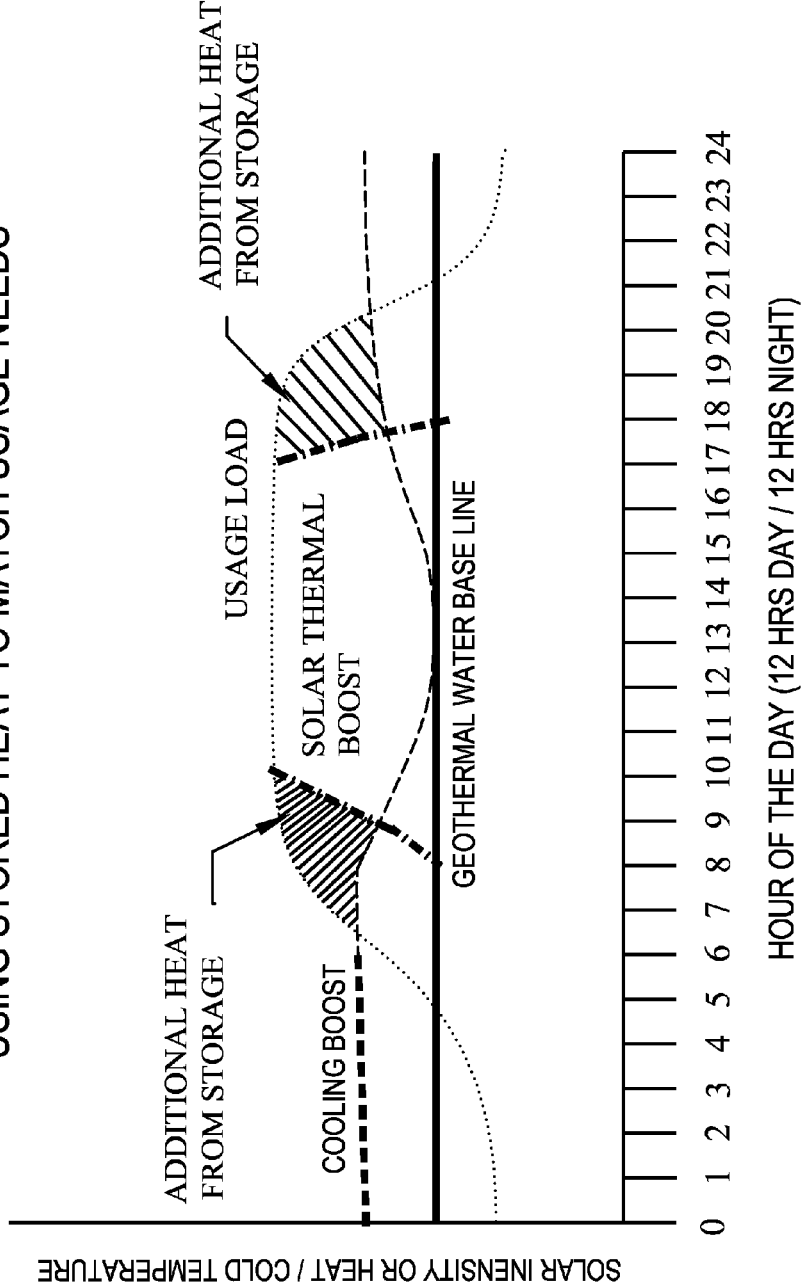

HYBRID THERMAL POWER AND DESALINATION APPARATUS AND METHODS

CROSS REFERENCE TO RELATED APPLICATIONS

This application is a continuation-in-part of U.S. patent application Ser. No. 14/247,226, filed 7 Apr. 2014, which claims priority to U.S. Provisional Patent No. 61/809,398, filed 7 Apr. 2013, which are herein incorporated in full for all purposes.

GOVERNMENT SUPPORT

None.

FIELD OF THE INVENTION

This invention is related to a Rankine cycle power generation facility having geothermal and auxiliary heat sources combined with a thermal chimney or a natural convective cooling tower and to methods of use for power generation and desalination.

BACKGROUND

Problems associated with anthropogenic climate change have driven the need for increased energy production from non-fossil fuel sources. Geothermal is particularly attractive. A relatively untapped and sustainable energy resource is low temperature geothermal heat. This is heat within the earth's crust that is near enough to the surface to be extracted as hot water or steam. While high grade geothermal heating sources such as seen in the Yellowstone basin are relatively rare, lower grade resources are relatively common along fault lines and around dormant volcanoes, and potentially could operate for thousands of years with good stewardship.

The capacity to generate power from low grade geothermal sources (some of which are below 100° C.) has only recently been developed and benefits from a thermal boost obtained from solar collectors (or other supplementing heat sources) mounted in series or in parallel with the geothermal feed. The state of the art can be appreciated from publications such as by Boyd (Technical Assessment of the Combined Heat and Power Plant at Oregon Institute of Technology, Klamath Falls, Oreg.), as was presented at the Geothermal Resources Council annual meeting of 2012, and by Kuyumcu (Hybrid Geothermal and Solar Thermal Power Plant Case study), presented at the same symposium, both of which describe working power plants based on geothermal and solar organic Rankine Cycle (ORC) technology. Combined concentrated solar and geothermal power generation was also described by Nelson (Concentrated Solar and Geothermal Hybrid Power Project) at the GRC 2012 annual meeting. An early vision of the general concept of combined geothermal and solar power is found in U.S. Pat. No. 4,099,381 to Rappaport. These publications are incorporated in full by reference for all that they teach and disclose.

Thus, combined solar and geothermal heat engines enable use of lower grade geothermal heat sources and represent an exciting form of alternative energy to fossil fuels. A geothermal power cogeneration plant is located at the Oregon Institute of Technology in Klamath Falls, Oreg., and is currently rated for 280 KWe, supplying power and most of the heat to an entire campus. Another plant operates in Turkey at 4-6 MW (depending on the season). The potential energy in known low to moderate temperature geothermal fields is typically discussed in gigawatts of renewable capacity, a vast and widely available resource that may be operated with a negligible carbon footprint.

In a single-pass system, brine extracted from a geothermal field becomes a waste product, and efforts are underway to recycle this brine by cycling it back through the porous subterranean features in a continuous loop. This entails pumping it out from a supply well and back into the geothermal field at a return injection well, where the two wells are connected by a percolating bed in the rock overlying the hot magma. This also reduces the risk of pumping the geothermal feature dry. Thus combined solar/geothermal plants offer sustainable energy with little or no environmental impact.

However, it has not generally been recognized that while solar heating is diurnal, at peak intensities it has the capacity to "back out" the relatively constant geothermal heat input into an ORC boiler, and the solar overheat will result in excess heat being sent back to the return well, such that the capacity to percolate fluid through the subterranean geology can be permanently damaged through chemical processes that affect the $K_{sp}$ of minerals in the brine and by other degradative processes.

Therefore, there is a pressing need to develop means to more efficiently cool solar-heated geothermal brines before returning them to the earth, and desirably, to increase the use of waste heat from Rankine Cycle devices generally. Methods known for increasing the efficiency of a Rankine Cycle include: lowering the operating pressure—temperature of the condenser by lower the temperature at which heat is rejected (subject to the limiting ambient conditions), adding a superheat to the working vapor, and increasing the evaporator or boiler temperature by adding supplemental heat (and thus increasing the pressure for the same working fluid vapor). It is also an object of this invention to improve efficiency in the heat sink downstream from the boiler and to combine the condenser with a geothermal cooling loop to reduce brine temperature before return to the geothermal field. Also recognized is a need to synchronize power generation with demand. These and other disadvantages of the prior art are addressed by the invention disclosed here.

SUMMARY

This invention is related to Rankine Cycle engines utilizing mixed thermal inputs and one or more heat sinks. In this disclosure, Rankine Cycle engines are more generally referred to as "thermal power generating systems" or "heat engines", and certain concepts that may be more generally applied to Carnot-type heat engines. In more specificity, the invention relates to improvements in the efficiency of these systems for power generation by collecting and harvesting waste heat from the brine outlet of the ORC evaporator—superheater in a thermal stack that passively drives convective air cooling of the working fluid condenser and the geothermal brine in the return line. The working fluid recirculates in the heat engine. Generally, in the practice of the invention, the object is to convert the waste heat to energy via a passively driven convective process in a thermal chimney. By increasing the convective effect, more heat is drawn out of the brine. The more heat rejected in the thermal stack, the more convective air flow occurs. In another embodiment, additional loops such as the solar loop are also added to the thermal stack to augment the convective draft.

In a preferred embodiment, the convective draft is augmented by providing additional heating in the chimney from the geothermal water (after exiting the engine), and from the solar heating loop by additional heat exchangers. The working fluid condenser is generally positioned at the bottom of the thermal stack to receive cooler air, and thus improve its efficiency, and the solar heat exchanger is generally positioned at the top of the thermal stack, so as to maximize the thermal gradients driving the convective air flow while providing the most cooling to the condenser and the geothermal brine heat exchanger during peaks in insolation. In these embodiments, the Rankine Cycle power generation plant is in combination with a "thermal stack" mounted at the base of a thermal chimney, the thermal stack having a condenser, a first heat exchanger fluidly connected to a geothermal heating loop, a second heat exchanger fluidly connected to a solar concentrator heating loop, such that the thermal stack acts cooperatively to generate a natural convective flow of air coolant across the condenser and up the thermal chimney, thereby increasing efficiency of the Rankin Cycle heat engine. Surprisingly, this combination can also generate additional power from the waste heat of the three loops by driving an air turbine mounted in the thermal chimney. The accessory air turbine power is from the natural convective flow of air coolant rising in the chimney.

In another aspect, the invention may include a solar absorbent and thermal conductive layer on the thermal chimney, the solar absorbent and conductive layer for heating the air coolant rising within the thermal chimney and driving a suction pressure to drive the air turbine at higher output.

In yet another embodiment, the geothermal loop may include a heat exchanger in the thermal stack that is fitted with a sediment removal trap.

Generally the power generated by a turbine or turbines in the thermal chimney is sufficient to pump the fluids through the heat engine. Thus the entire system can be operated without forced air cooling, an advance in the art. Because the brine is returned to the geothermal field at a sufficiently low temperature such that sediments which would otherwise precipitate when cooled have either already precipitated (and are removed downstream from the thermal stack), or are thermally equilibrated so that no cooling occurs after injection, the geothermal percolating beds are preserved for sustained use.

In yet another aspect, the invention is embodied in a Rankine Cycle power generation plant having a thermal stack mounted at the base of a thermal chimney with central channel, the thermal stack having a condenser, a first heat exchanger fluidly connected to a geothermal heating loop, a second heat exchanger fluidly connected to a solar concentrator heating loop, further characterized in that the thermal stack acts cooperatively to generate a natural convective flow of air across the condenser and up the central channel of the thermal chimney. In a first preferred embodiment, the thermal chimney further comprises an air turbine for generating accessory power from the natural convective flow of air. The thermal chimney may be provided with an absorbent layer or coating enabled to absorb incident solar insolation, the absorbent layer transferring added heat to the central channel for warming the air rising within the thermal chimney and increasing suction pressure to drive the air turbine at higher output. Also preferred, the thermal chimney may comprise a water evaporator zone, such as a spray head assembly (250), such that molecular water from a water feed is entrained as water vapor (i.e., distilled) into air rising convectively up the thermal chimney, and thereby the water vapor may be collected and stored as a source of fresh water, such as for crops, or for use in future power generation. Minerals precipitated in the apparatus may also be collected for refining into commodities, such as lithium and rare earths.

In yet another aspect, an auxiliary combustion chamber can be substituted for or supplement the solar boost loop. When used, fuel is introduced thru a combustion fuel header, and combustion air is provided by a forced draft blower so as to heat the circulating working fluid, resulting in water of combustion, carbon dioxide and nitrogen. The carbon dioxide is removed by a scrubbing solution. The water vapor is ported into the thermal chimney below the condenser while the scrubbing solution containing the carbonate salts is routed to the evaporator zone. These modifications are in response to a need for a larger volume of heat energy for use in the generator during peak loads, and for additional potential energy in the form of water stored at an elevated head pressure so as to be released when demand for power is highest, and synergically, that water is also used for adding make-up volume to be returned to the geothermal field, a not uncommon problem in managing these resources.

The foregoing and other elements, features, steps, and advantages of the invention will be more readily understood upon consideration of the following detailed description of the invention, taken in conjunction with the accompanying drawings, in which presently preferred embodiments of the invention are illustrated by way of example.

It is to be expressly understood, however, that the drawings are for illustration and description only and are not intended as a definition of the limits of the invention. The various elements, features, steps and combinations thereof that characterize aspects of the invention are pointed out with particularity in the claims annexed to and forming part of this disclosure. The invention does not necessarily reside in any one of these aspects or drawings taken alone, but rather in the invention taken as a whole.

BRIEF DESCRIPTION OF THE DRAWINGS

The teachings of the present invention are more readily understood by considering the drawings, in which:

FIGS. 8A-8B illustrates an ORC with solar boost loop and thermal chimney with central draftway for generating and storing fresh water from brine or ground water.

FIGS. 10A, 10B and 10C are Heat Transfer Plots used for engineering a geothermal base case (FIG. 10A, assuming low-grade thermal brine as heat input), a "solar boost" case (FIG. 10B), and a geothermal engine with solar boost and a thermal stack/thermal tower forming an enhanced heat sink combination (FIG. 10C).

FIG. 15D is a plot of operating temperatures showing the use of thermal storage capacity to match energy generation to daily variations in load.

Figure 1:
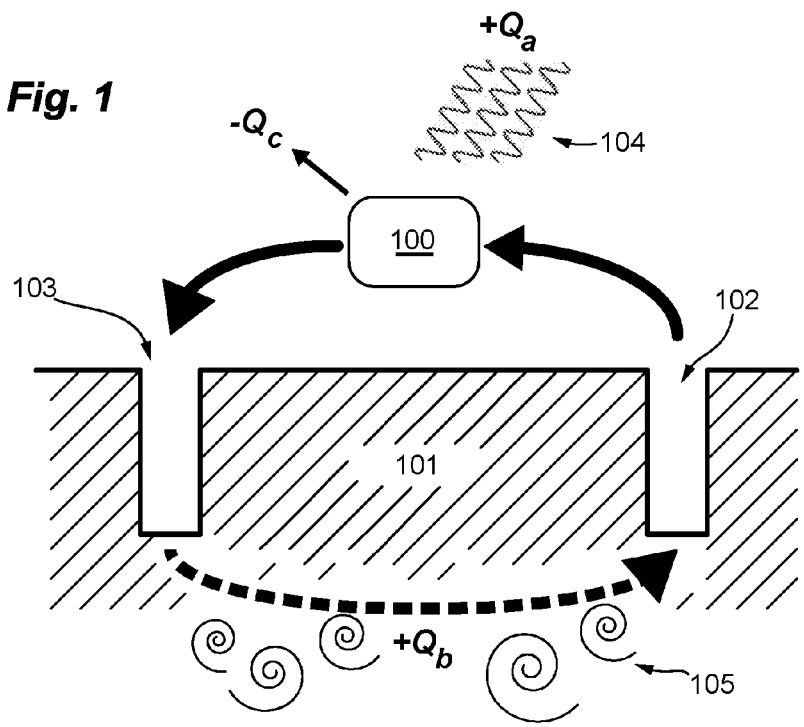
FIG. 1 is a schematic view of a power plant with Rankine Cycle turbine driven by a combination of geothermal and solar heating.

The drawing figures are not necessarily to scale. Certain features or components herein may be shown in somewhat schematic form and some details of conventional elements may not be shown in the interest of clarity and conciseness. The drawing figures are hereby made part of the specification, the written description and the teachings disclosed herein.

NOTATION AND NOMENCLATURE

Certain terms throughout the following description are used to refer to particular features, steps or components, and are used as terms of description and not of limitation. As one skilled in the art will appreciate, different persons may refer to the same feature, step or component by different names. Components, steps or features that differ in name but not in function or action are considered equivalent and not distinguishable, and may be substituted herein without departure from the invention. Certain meanings are defined here as intended by the inventors, i.e., they are intrinsic meanings. Other words and phrases used here take their meaning as consistent with usage as would be apparent to one skilled in the relevant arts. The following definitions supplement those set forth in the Background and other sections of this specification.

Power plants operating on a "Rankine cycle" (RC), in which a working fluid is continuously evaporated into a vapor, driven through a turbine, and condensed in a condenser are known in the art. (Working fluids may include water, ammonia, carbon dioxide, aqueous solutions of lithium bromide, and so forth as are known in the art). Where the working fluid is not water, but is an organic liquid, the cycle is termed an "Organic Rankine Cycle" (ORC). The turbine may be used to perform work or power may be converted to electrical energy in a generator, for example. Work from the turbine can be stored either as potential energy or kinetic energy for recovery and use (or conversion to electrical energy) at a later time.

A "Recuperative Rankine Cycle" (RRC) is so named because the cold condensed working fluid is heated by a secondary heat exchanger, often termed a "recuperator", from the hot turbine exhaust vapor before entering the condenser.

Exergy (B) represents the available energy in a system, including both enthalpy and entropy, and may be written for some applications as $$B = H - T_0 S,$$

where H is enthalpy, $T_0$ is the temperature, and S is the entropy of the system. The enthalpy of a homogeneous system is defined as $$H = U + pV,$$

where U is the internal energy, p is the pressure of the system, and V is the volume of the system. For a constant volume process, $$Q = \Delta U,$$

where Q is energy, generally given in KJ/kg, and is most frequently of interest in the context of a heat flow rate to or from the system (energy per unit time). Exergy and enthalpy are extensive properties; they are scalable, but exergy involves process conditions, environmental atmospheric reference conditions $T_0$, $p_0$, $z_0$, and atmospheric composition.

General connection terms including, but not limited to "connected," "attached," and "affixed" are not meant to be limiting and structures so "associated" may have other ways of being associated, for example pipes may be fluidly connected and fixtures may be physically attached by any operative means known in the art without limitation to particulars unless necessary to achieve the objects of the invention.

Relative terms should be construed as such. For example, the term "front" is meant to be relative to the term "back," the term "upper" is meant to be relative to the term "lower," the term "vertical" is meant to be relative to the term "horizontal," the term "top" is meant to be relative to the term "bottom," and the term "inside" is meant to be relative to the term "outside," and so forth.

Unless specifically stated otherwise, the terms "first," "second," "third," and "fourth" are meant solely for purposes of designation and not for order or limitation.

Reference to "one embodiment," "an embodiment," or an "aspect," means that a particular feature, structure, step, combination or characteristic described in connection with the embodiment or aspect is included in at least one realization of the present invention. Thus, the appearances of the phrases "in one embodiment" or "in an embodiment" in various places throughout this specification are not necessarily all referring to the same embodiment and may apply to multiple embodiments. Furthermore, particular features, structures, or characteristics of the invention may be combined in any suitable manner in one or more embodiments.

It should be noted that the terms "may," "can,'" and "might" are used to indicate alternatives and optional features and only should be construed as a limitation if specifically included in the claims. It should be noted that the various components, features, steps, or embodiments thereof are all "preferred" whether or not it is specifically indicated. Claims not including a specific limitation should not be construed to include that limitation. The term "a" or "an" as used in the claims does not exclude a plurality.

"Conventional"—refers to a term or method designating that which is known and commonly understood in the technology to which this invention relates.

Unless the context requires otherwise, throughout the specification and claims that follow, the term "comprise" and variations thereof, such as, "comprises" and "comprising" are to be construed in an open, inclusive sense that is as "including, but not limited to."

The appended claims are not to be interpreted as including means-plus-function limitations, unless such a limitation is explicitly recited in a given claim using the phrase "means for."

A "method" as disclosed herein refers one or more steps or actions for achieving the described end. Unless a specific order of steps or actions is required for proper operation of the embodiment, the order and/or use of specific steps and/or actions may be modified without departing from the scope of the present invention.

DETAILED DESCRIPTION

Referring to FIGS. 1 through 14, there is illustrated therein a Rankin Cycle (RC) machine or apparatus having improvements defined herein. This machine may include a turbine, such as is used to generate power and may also include a cyclone for harvesting fresh water for brine or brackish water sources. As shown in FIG. 1, the RC device (100) may be driven by flows of thermal energy from the earth (101) and from the sun's rays (104). Here a first energy flow is represented by $+Q_b$, and is a geothermal source. A solar energy flow $+Q_a$ is an intrinsic heat, and is realized when contacted with a suitable absorber such as a solar collector. While geothermal heating may be conducted in a single pass system, recent advances have demonstrated the feasibility of geothermal loops, where subterranean brines are heated by magma and may be pumped from the earth in a first well (102), cycled through a Rankine Cycle device, and then returned to the earth via a second well (103). Under suitable conditions, the brine will percolate from the return well to the supply well and be reheated (105) in the process while circulating in a continuous loop. Also shown is $-Q_c$, which represents a heat sink for the RC device. In a conventional device, this is typically forced air directed at a condenser.

Figure 2:
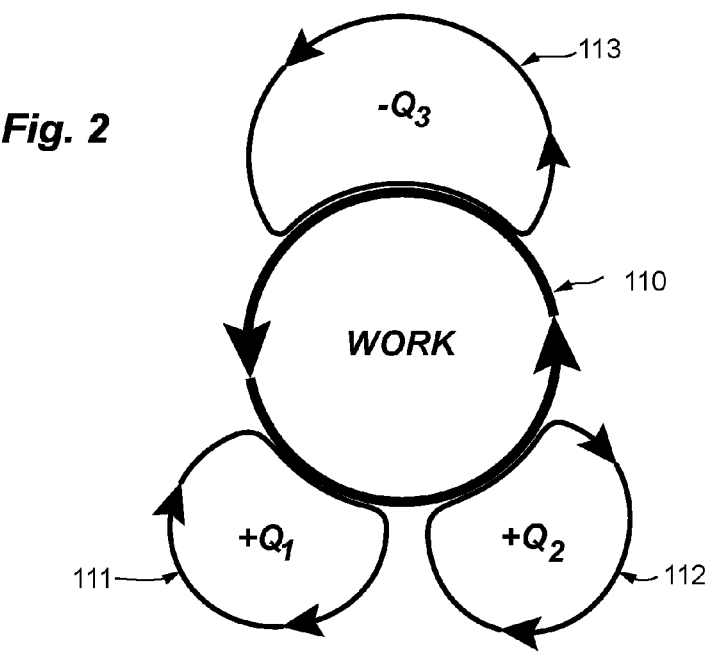
FIG. 2 is a schematic view of a power generation system driven by two thermal inputs ($+Q_1$, $+Q_2$) and by an heat sink ($-Q_3$) having features for an improved efficiency of the work cycle.

FIG. 2 is a schematic view of a power generation system having at the center a heat engine driven by cyclical flow of a working fluid (110). The heat engine is driven by two thermal input loops ($+Q_1$, 111 and $+Q_2$, 112) and by a heat sink ($-Q_3$, 113) having features for improved efficiency of the work cycle. The work cycle is generally manifested as a cyclical flow of a working fluid, which when boiled at higher pressure (temperature) is used to drive a turbine, for example. Thermal inputs may be drawn from a range of sources, most preferably a combination of geothermal and solar heating operating in tandem or parallel, but also conventional heating sources such as fossil fuels, resistive heating elements powered by photovoltaic cells, gasification facilities, industrial process waste heat, wind generators, and so forth.

Although the thermal inputs are preferably driven cyclically (as represented by loops to indicate renewable processes), it is also recognized that the heat sink of the invention may operate cooperatively with heat sources that are not operated as continuous loops, such as a flame-fired boiler, for example, where heat is directed into the working fluid without flow of an intermediary fluid.

Heat sinks can be either passive or powered by air circulation fans; but passive operation is preferred. As will be shown in the following figures, waste heat on the exit side of the geothermal and solar heating loops (and also the working fluid) may be used to drive natural convective air flow in a thermal chimney. A thermal stack of heat exchangers, generally stacked with a condenser for the working fluid on the bottom, a geothermal loop heat exchanger in the middle, and a solar loop heat exchanger on top, are used to heat air, which rises in the chimney, creating a suction pressure that draws cold air in from the bottom, and builds momentum sufficient that the moving air mass will power an accessory air turbine generator, for example. Thus unexpectedly, an advantage of the passive systems described is that the advanced thermal stack technology achieves additional power (or work) and is a technical advance in the art.

Figure 3:
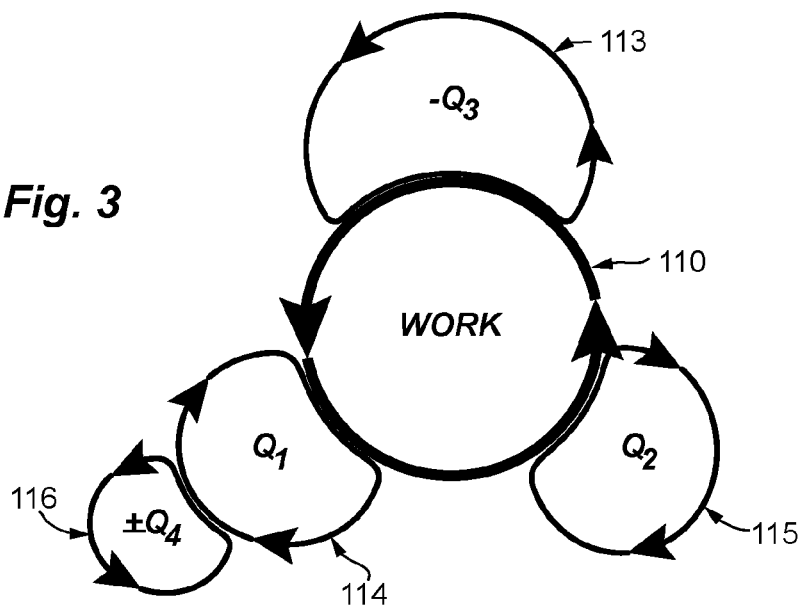
FIG. 3 is a conceptual view illustrating the capacity of the improved system to integrate complex heat input loops ($Q_1$, $Q_2$, $Q_4$) and a heat sink ($-Q_3$).

FIG. 3 is a conceptual view illustrating the capacity of the improved system to integrate complex heat input loops ($Q_1$, 114, $Q_2$, 115, $Q_4$, 116). Loop $Q_4$ is shown as operating indirectly on the working fluid, as would occur for example when an accessory loop is used to divert excess solar heating to a heat storage system during the day, and then the heat is released back into the heat engine in the evening when the sun is down and energy demand is highest. It would be well understood by one skilled in the art that loops $Q_1$ and $Q_4$ are joined by a heat exchanger, for example. Thus loops $Q_1$, $Q_2$, and $Q_4$ may represent a variety of heat sources having the common property of exchanging heat with a working fluid loop 110.

Similarly, loops $Q_1$ and $Q_2$ may represent a primary loop and a secondary loop, such as where a solar concentrator operates to boost the heat energy of a geothermal loop operatively driving the working fluid at the center. In this instance, $Q_2$ may also represent an alternate heat source such as waste energy from a syngas-fired power plant, from a methane combustion generator or a chemical processing plant, the thermal energy being fungible. Heat sink loop ($-Q_3$, 113) operates to extract heat from the working loop 110 in the center, as required to complete the heat engine cycle (i.e., vapor condensation). By the nature of the heat sink, which operates by natural convective cooling of a thermal stack having a condenser and a plurality of heat exchangers mounted in a thermal chimney, additional energy can be extracted from the system according to the magnitude of the convective flow rate in the chimney.

Figure 4:
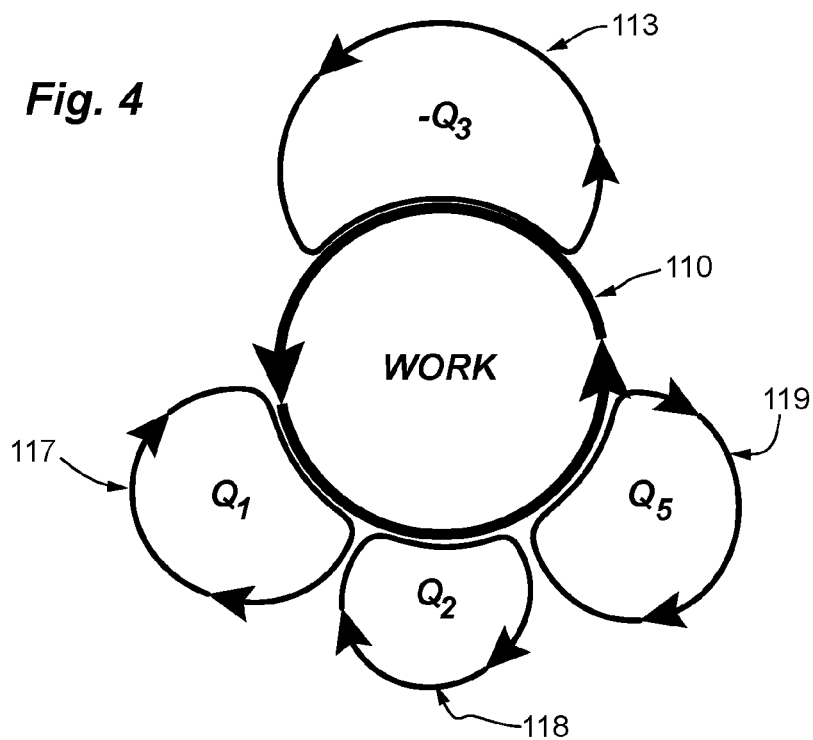
FIG. 4 is a conceptual view illustrating the capacity of the improved system to integrate a plurality of mixed heat sources ($Q_1$, $Q_2$, $Q_5$) such as geothermal, solar, and supplemental heating sources, and a heat sink ($-Q_3$).

FIG. 4 is a conceptual view illustrating the capacity of the improved system to integrate a plurality of mixed heat sources ($Q_1$, 117, $Q_2$, 118, and $Q_5$, 119) such as geothermal, solar, and supplemental heating sources. Again, $-Q_3$ represents heat extraction from the working fluid so as to increase the $\Delta T$ available for driving the heat engine. But this extracted energy is not wasted, and in systems of the invention instead is used to drive a convective flow in a thermal chimney, that flow having a momentum which can be harnessed to perform additional work.

Figure 5:
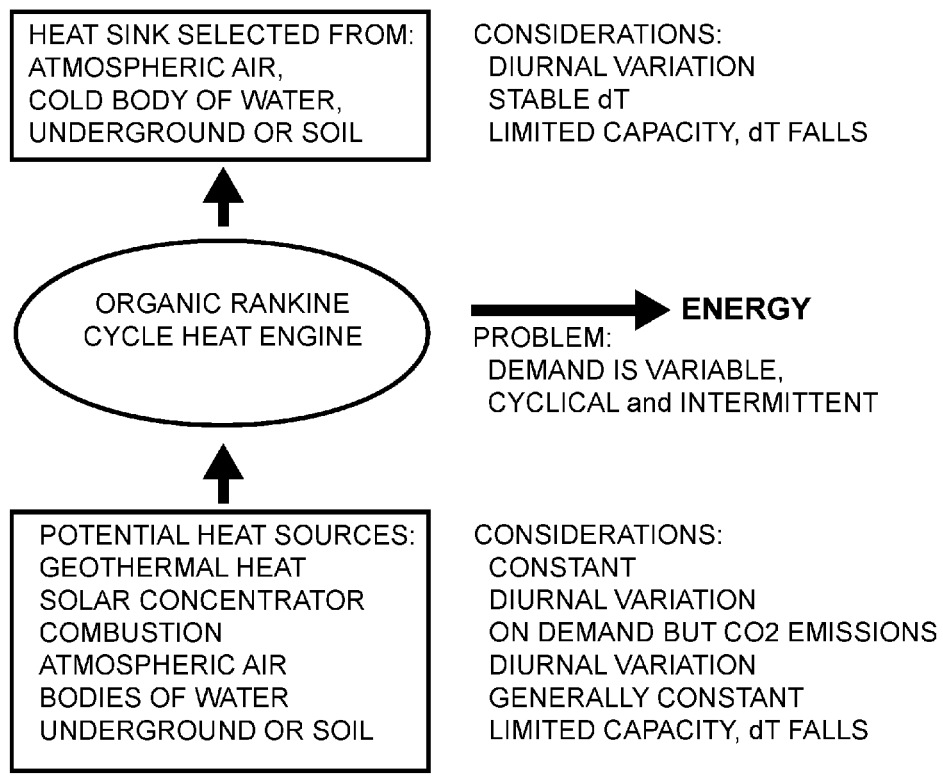
FIG. 5 is a schematic of a Rankine Cycle device drawn as a Carnot Heat Engine, and illustrates considerations given in improving efficiency, in particular the need to use complementary heat sources and thermal sinks so as to better match the energy user timing needs.

Referring to FIG. 5, a schematic view of a Rankine Cycle heat engine is introduced, and aspects of the efficiency of ORC are discussed. Traditionally, heat is used in an ORC heat engine to boil a working fluid. This vapor is then depressurized and expanded through a turbine to extract the available power, the exhaust vapor (and in some cases some liquid) is then condensed and pumped back to the boiler to repeat the cycle. There is a theoretical limit to the potential power that is based on the Carnot Cycle (any real process cannot equal this limit due to thermodynamic inefficiencies):

$$\frac{W_{NET}}{Q_{IN}} = \frac{[T_{IN} - T_{OUT}]}{T_{IN}}$$

where $W_{NET}$ is the maximum available power, $Q_{IN}$ is the heat put into the system, $T_{IN}$ is the absolute temperature of the heat source, and $T_{OUT}$ is the absolute temperature of the heat sink.

Given this theoretical limit, limited power is produced by a heat source having a low ΔT relative to the heat sink temperature. For geothermal power production where the atmosphere is used as a heat sink, the practical minimum temperature difference is on the order of 75 to 80° C. In most cases the available atmospheric sink temperatures are on the order of 10 to 25° C., so that geothermal resources with temperatures below about 90 to 100° C. have in the past been impractical.

Figure 6:
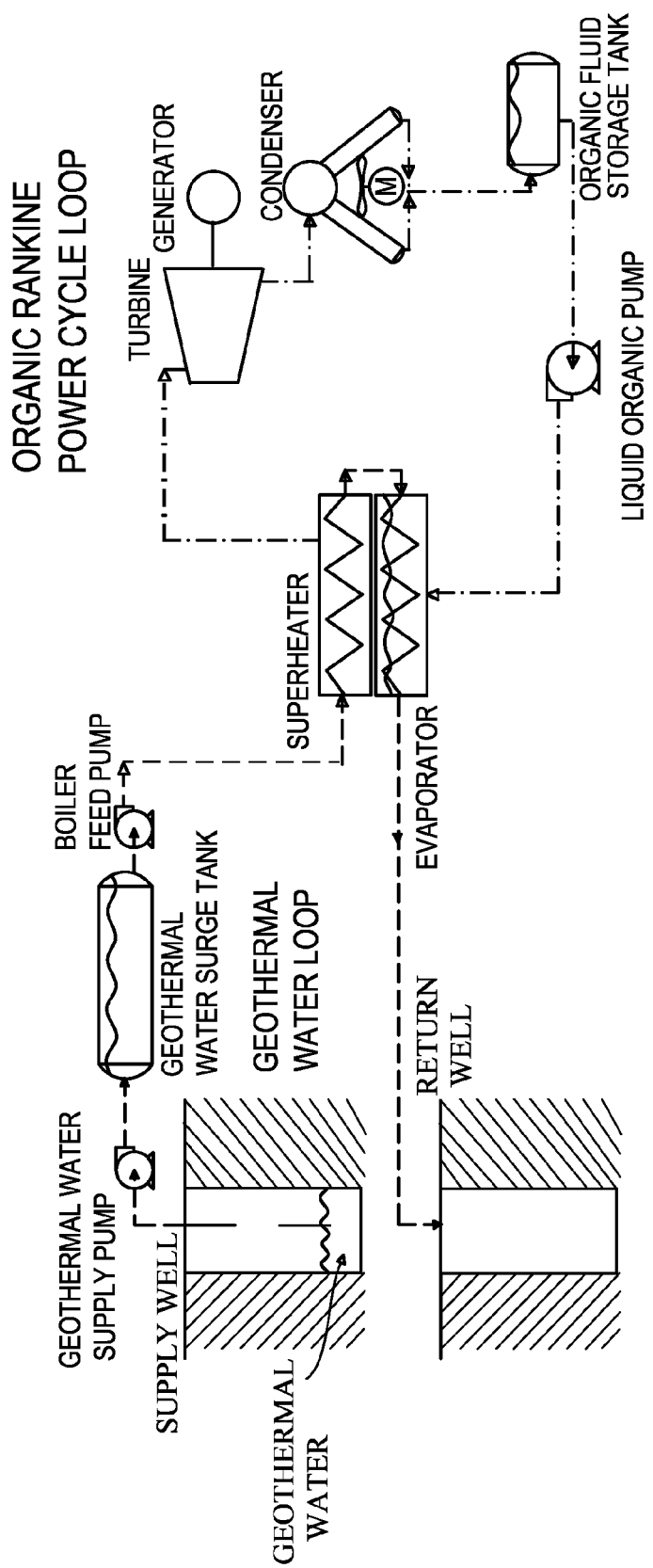
FIG. 6 is an ORC geothermal power generator with brine recycling.

FIG. 6 shows a schematic of a basic G-ORC (geothermal) facility. Hot brine from a geothermal supply well is pumped through the ORC evaporator and superheater where a pressurized organic working fluid is heated to its boiling point, then boils to vapor, and finally the vapor is superheated near the inlet brine temperature. This superheated vapor leaves the boiler and goes into the inlet of the turbine where it expands and releases a portion of the heat energy turning the turbine shaft. The working fluid is selected according to the range of temperatures expected in the heat cycle, and may be a fluorocarbon oil for example. Organic working fluids also may include ammonia, water, and lithium bromide. Multi-working fluid, multi-turbine technologies may also be used.

The work done on the shaft is converted in an attached generator to produce electricity or to pressurize a pneumatic or hydraulic system, for example. Similarly, water pumped to a higher elevation could be used for irrigation, for example, using the work of the shaft. The vapor leaving the turbine is then condensed and the low pressure liquid is collected in a storage tank. This lower pressure liquid is then pumped back up to the boiler pressure and the cycle is repeated.

Figure 7:
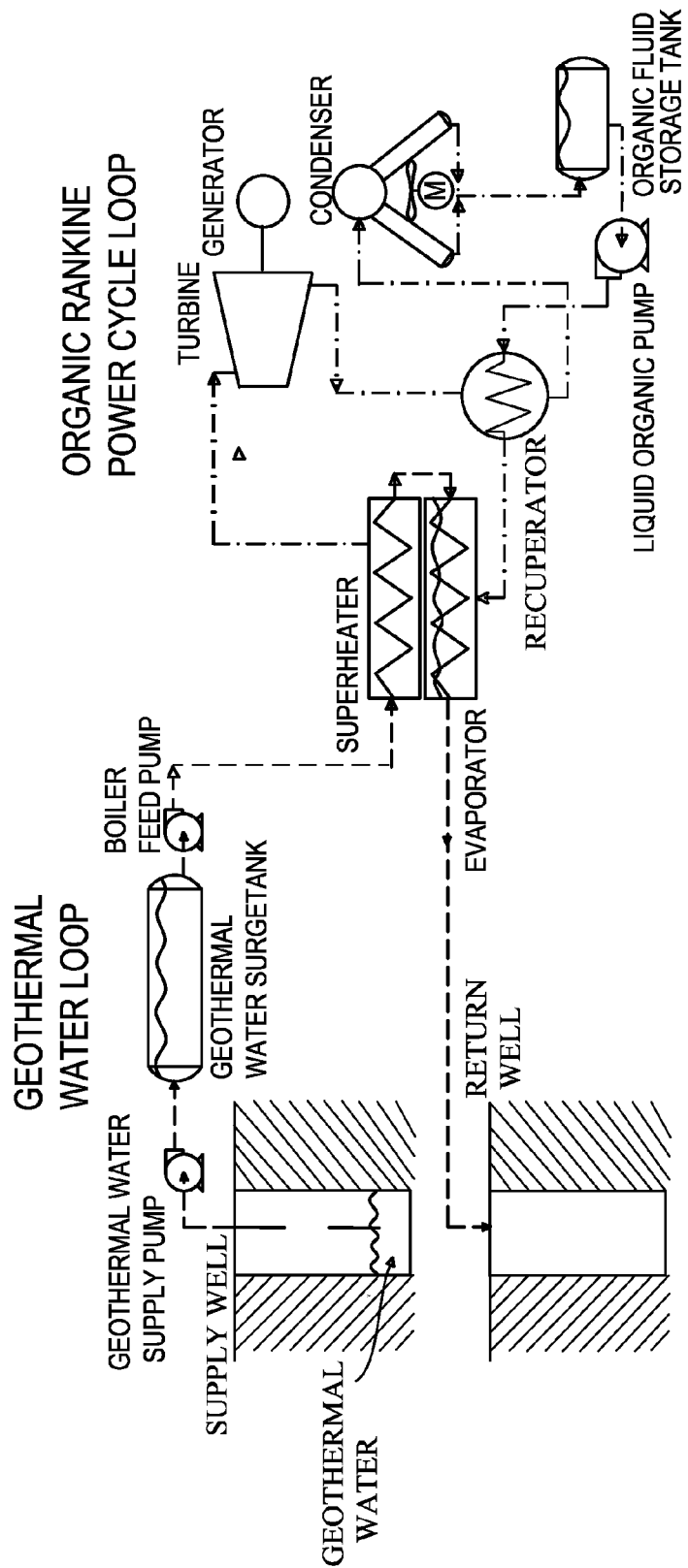
FIG. 7 illustrates the use of a recuperator to improve the thermal efficiency of the ORC heat engine.

FIG. 7 shows an improvement over a simple ORC by addition of a recuperator heat exchanger. The recuperator captures the residual superheat of the vapor leaving the turbine and transfers most of this heat into the colder pressurized liquid working fluid as it returns to the boiler. This R-ORC configuration has the effect of both reducing the heat removal needed in the condenser and reducing the heat required in the boiler to heat the cold liquid up to its boiling point.

Figure 8A:
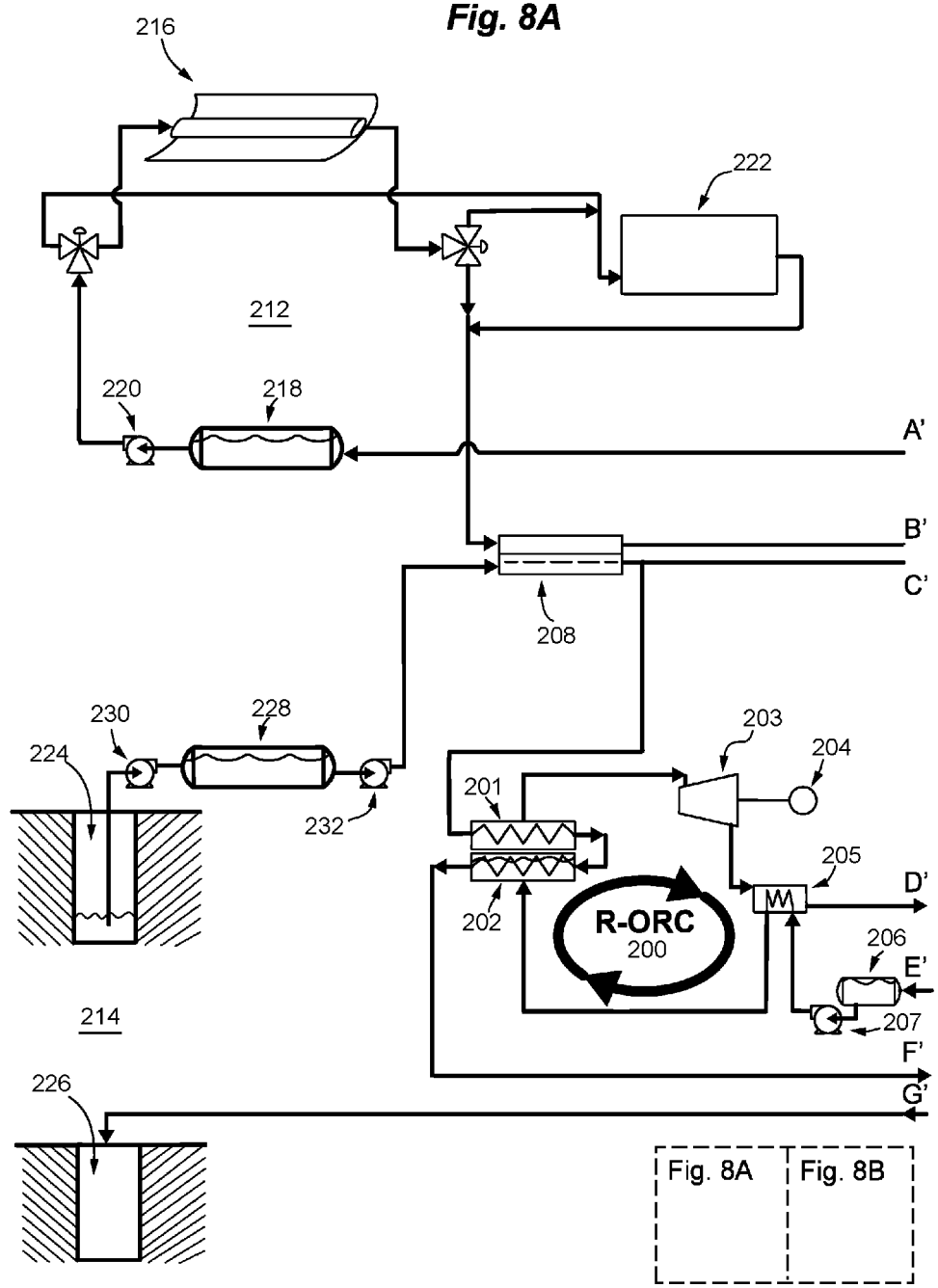

FIGS. 8A-8B are schematic views of a Rankine Cycle (R-ORC) with the turbine coupled to a thermal chimney with improved heat sink. The geothermal loop includes a supply well (224), return well (226), supply surge tank (228), and supply pump (230). Also provided is boiler feed pump (223).

An RRC cycle (200) is drawn figuratively in FIG. 8A, and includes superheater (201), evaporator (202), turbine (203), generator (204), recuperator (205), organic working fluid storage tank (206) with pump (207), and circulatory piping as indicated. Lines D' and E' carry flow to and from a condenser (211) which is the primary heat sink. Organic Working Fluid from the condenser (211) is returned to the hot well (208), and pumped (207) thru the recuperator (205) before returning to the evaporator (202), and superheater (201) to be vaporized and superheated. An auxiliary heat source is coupled to the R-ORC geothermal water via a plate and frame heat exchanger (208). The auxiliary heat source includes solar boost loop (212); including solar concentrator assembly (216), a Thermanol storage tank (218), circulation pump (220), and thermal storage unit (222); and/or an auxiliary hydrocarbon-fired heater (described later in FIG. 16 A).

Part of the hot Brine splits off the R-ORC loop and goes to the Thermal Tower spray evaporator (250) via line C' where fresh water is evaporated and the concentrated Brine is collected on tray (252) and pumped to the return injection well via line G'. As previously noted, by virtue of the added heat from the solar boost cycle or thermal storage unit, this brine should be returning to the ground at a temperature above the critical solubility temperature so as to avoid the potential for damaging underground formations.

A thermal chimney plant (240) is provided as a heat sink (FIG. 8B). A "COLD AIR INTAKE" is shown at the base of the thermal chimney (240), and the air exit at the top of the chimney (marked "DRY AIR DISCHARGE"). The thermal chimney contains a central airway, duct or channel (242) in which a thermal stack having a first heat exchanger for the geothermal brine (244) and a second heat exchanger for the solar boost loop (246) stacked above condenser (211). Cooler air entering at the bottom of the chimney exits as hotter air at the exchanger stack exit, the difference representing heat transferred to the updraft air from circulation inlets to the heat exchangers (246, 244) via lines B' and at F', and the ORC condenser; return heat transfer fluid and geothermal lines are shown marked A' and G'. Alternative piping for the heat exchanger loops may be built if desired but preferably the solar boost loop is superior to the geothermal loop where lower temperature geothermal sources are used. Typically the hottest loop is placed in a superior position. Returning the brine to the earth solves an otherwise irksome problem of disposal of the brine. The heated air leaving the thermal stack passes through risers in a collection tray (252), and then passes through a water curtain of hot geothermal water provided by spray headers (250). The falling geothermal water is caught on the tray (252), and pumped back to the injection well (226) via return pump (254). The moisture saturated air passes through the demister baffles (3) flowing upward and enters a conical swirl vortex inducer (4), where accelerating cyclonic flow is initiated. This high velocity cyclonic flow passes through a throat (5) where fog is formed and starts to condense. This mixed phase (moist air—condensed water) enters the diverging inlet (6) of the axial cyclone with its conical inner cone (260) that maintains the cyclonic velocity and continues the water agglomeration. It next enters the body of the cyclone with swirl vanes (262) where the liquid water is "centrifuged" toward the outside surface, and impinges on the water collection tray outer wall (265)

This condensate is captured in lateral gutters (264) and conveyed to a storage tank (266), and/or pond. This fresh water has a head pressure due to its elevation above the ORC turbine and generator. The water may be used for irrigation or for generating power, for example.

The apparatus and process are now described in more detail.

Initially the low velocity moist air leaving the evaporator section (250, 252, and 3) rises vertically (242) because of its relative low density compared to ambient air. This moist air then enters the aerodynamic axial cyclone via a converging spiral flow induction cone (4) which generates a much higher cyclonic velocity and this accelerated air mass will cool due to the internal energy reduction of the higher velocity. This cooling effect will cause the condensation of water from the entrained vapor moisture to form a "fog" and create a high rotational velocity moist air—water droplet mixture. This mixture will next pass through a throat (5) which will provide additional time for the fog and water droplets to agglomerate. This flow will then enter the axial cyclone divergent inlet (6) with its inner cone (260) which forms an annulus that maintains the cyclonic velocity with a larger radius. A set of inlet guide vanes (262) mounted at the cyclone inner cone (260) continue to spin this air—water mixture. This vortex flow will then discharge through the guide vanes and enter the cyclone body. —Because the condensed water is a higher density than the air, it will preferentially move outward toward the outer edge of the circulating mixture. The outer wall of the cyclone will intercept these outward moving water droplets and provide a surface for coalescence into larger drops. These droplets will decelerate along the inside of the outer wall (265) due to hydraulic friction and fall into a water collection ring (264) with a hydraulic seal preventing the air escaping. —This collected water will then be piped to an elevated storage (head) tank (266).

The upper segment of the tower is double walled, having an internal sheath inside the outermost wall forming an annular bypass flow path. This allows heated air to bypass the evaporator and condenser so as to maintain adequate air flow across the thermal exchangers (211, 244, and 246). This bypass hot air rises in the annular passage (2) and its flow is controlled by the positioning of dampers (7) in pipes (8) connecting this annulus with the axial cyclone discharge. These pipes will be directed tangentially into the axial cyclone exit so as to create additional cyclonic flow which will reduce the flow resistance of the system air exit.

For some purposes, the elevated storage head tank or pond (266) is a source of hydraulic potential energy, with respect to the ORC plant elevation, for operating a turbine-driven generator at the ORC generator elevation, thereby providing additional energy and fresh water on demand.

In other embodiments, the elevated fresh water source which can be used to produce power by guiding the water back down the hill to any appropriate elevation and recovering the elevation potential energy as kinetic flowing water energy using a standard water turbine (hydroturbine) similar to technology used by run of the river systems incorporating a head tank inlet pipe and water turbine. The water can then be used from that elevation for agriculture or other uses.

The water power generation capability can be incorporated with a sizable elevated storage pond on the top of an appropriate hill. The water release can be timed to load follow the electric power requirements of the connected loads. This is essentially a thermally driven "pumped storage". The thermal driving power of the thermal chimney lifts and purifies the water. This stored water can then be released to create power on demand, essentially making the "solar/geothermal/auxiliary heat" energy available on demand with or without sunshine.

The elevated storage tank can be used for distribution of the fresh water suitable for farm irrigation. The water would be piped at elevation to the receiving farm. At the location of water-use, the elevation pressure can be converted to kinetic energy and/or head pressure to provide spraying the water onto the fields. In this technique the water and its associated kinetic and pressure energy would operate the typical irrigation equipment while reducing or eliminating the need for supplemental electrical driven pumps.

Figure 9A:
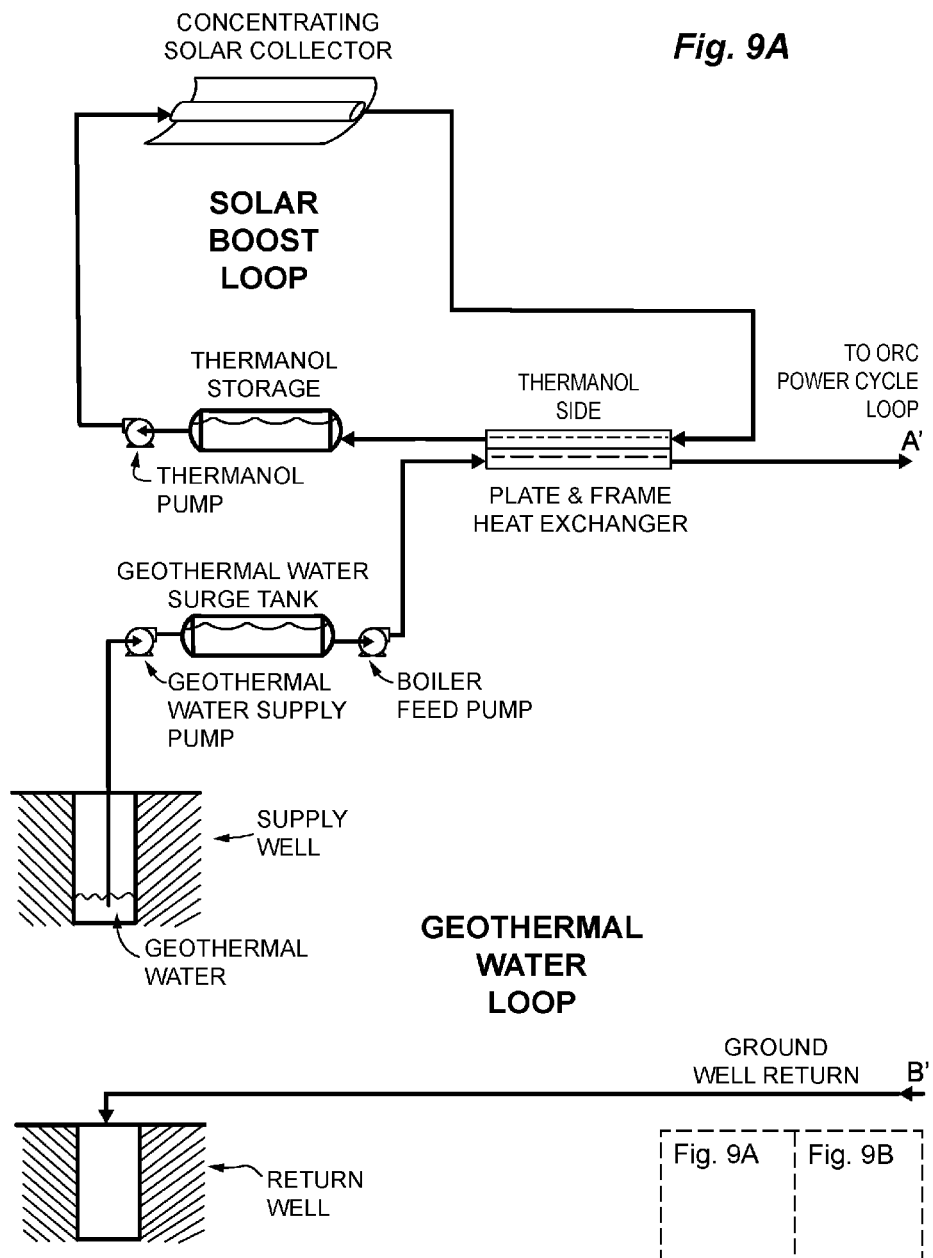
FIGS. 9A and 9B show a combination of ORC geothermal power generation with a "solar boost" unit operation loop.
Figure 9B:
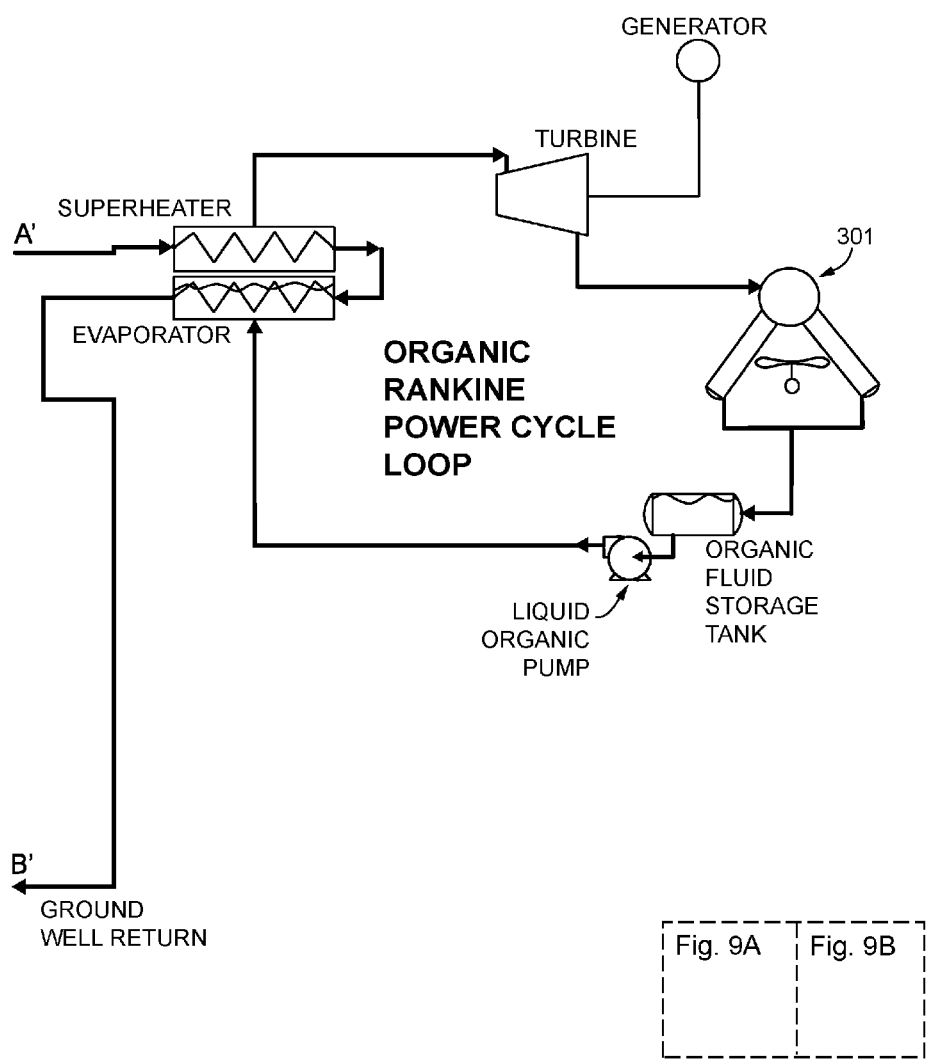

FIGS. 9A-9B illustrate another modification of the basic cycle. Here a "solar boost" loop is used to increase the heat of the geothermal loop. As shown, this loop is operated to transfer solar collector heat to the geothermal fluid at a heat exchanger just upstream from the boiler, but other variants would be obvious to one skilled in the art. This solar boost allows the boiler to operate at a higher boiling temperature and pressure which allows for better efficiency for the Rankine Cycle (because of the greater temperature difference). In this way, lower quality geothermal resources may become productive sources of renewable power. Working fluid in the RC cycle is condensed in a condenser (301) before being recirculated back to the evaporator and superheater for vaporization and then back through the turbine.

The heat for this solar boost is provided by a recirculating heat transfer fluid that is heated by concentrating solar collectors; solar collectors that are often formed with a parabolic reflector, such as are known in the art. The solar loop includes a recirculation pump and a storage tank. The circulating fluid may be chosen according to the range of temperatures utilized in the cycle, and may be mineral oil or hydrocarbon-type heat transfer fluid, for example.

Figure 10B:
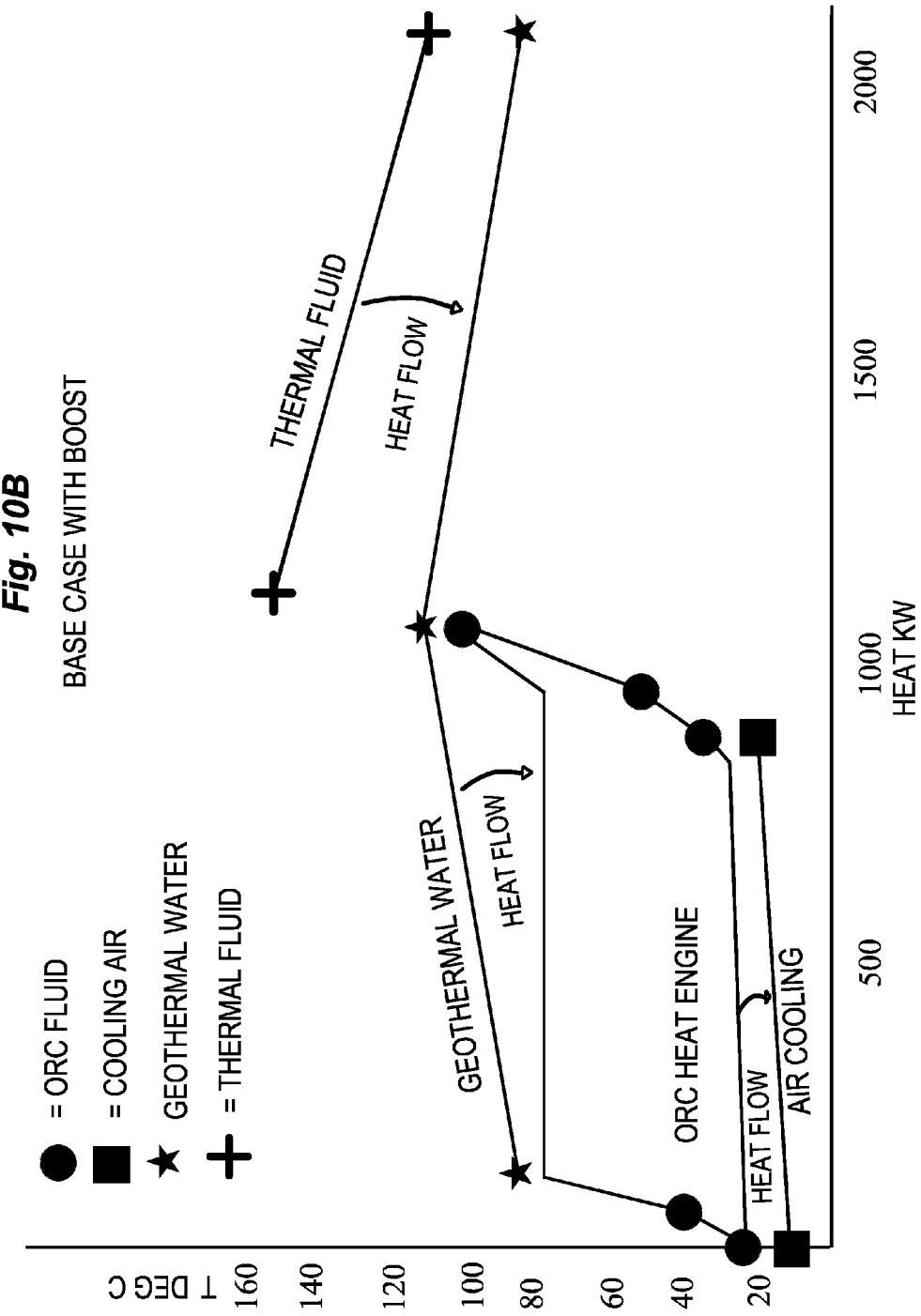

FIGS. 10A, 10B and 10C are Temperature-versus-Heat-Transfer diagrams used for engineering a geothermal base case (FIG. 10A), assuming low grade thermal brine as heat input), a "solar boost" case (FIG. 10B), and a case combining a geothermal heat engine with solar boost with a thermal stack and thermal tower (FIG. 10C). Comparing FIGS. 10A and 10B, it will be seen that condenser operating conditions are the same in both cases, but the working fluid in the boiler is boosted by 20° C. with a solar assist. Peak temperature of the geothermal brine into the evaporator and superheater is about 90° C. in the base case and about 110° C. in the solar boost case. About 240 KJ/kg of turbine power is achieved in the base case, but this output is increased to about 275 KJ/kg in the solar boost case using the same geothermal flow rate. Thus the solar boost case (FIG. 10B) demonstrates about a 10% increase in power production.

At peak insulation, a solar boost not only supplements the geothermal brine temperature and improves power output, but also raises the geothermal brine return temperature and effectively reduces the percentage or ratio of heat supplied from the geothermal well. In other words, the solar energy essentially "backs out" and replaces part of the geothermal heat, which is an unintended consequence. On very hot days, the geothermal brine exiting the heat engine may enter the return well hotter than the feed brine. Studies have suggested that overheated brine return may lead to higher resistance in the percolating bed. Because the integrity of the bed is essential for recirculating the brine through the magma heated substrata, chronic "back out" conditions can lead to loss of the desirable capacity to recirculate the brine rather than dispose of it. Consequences include the need to relocate blocked injection wells and other undesirable expenses. Our solution to this problem will be discussed further below.

Figure 11A:
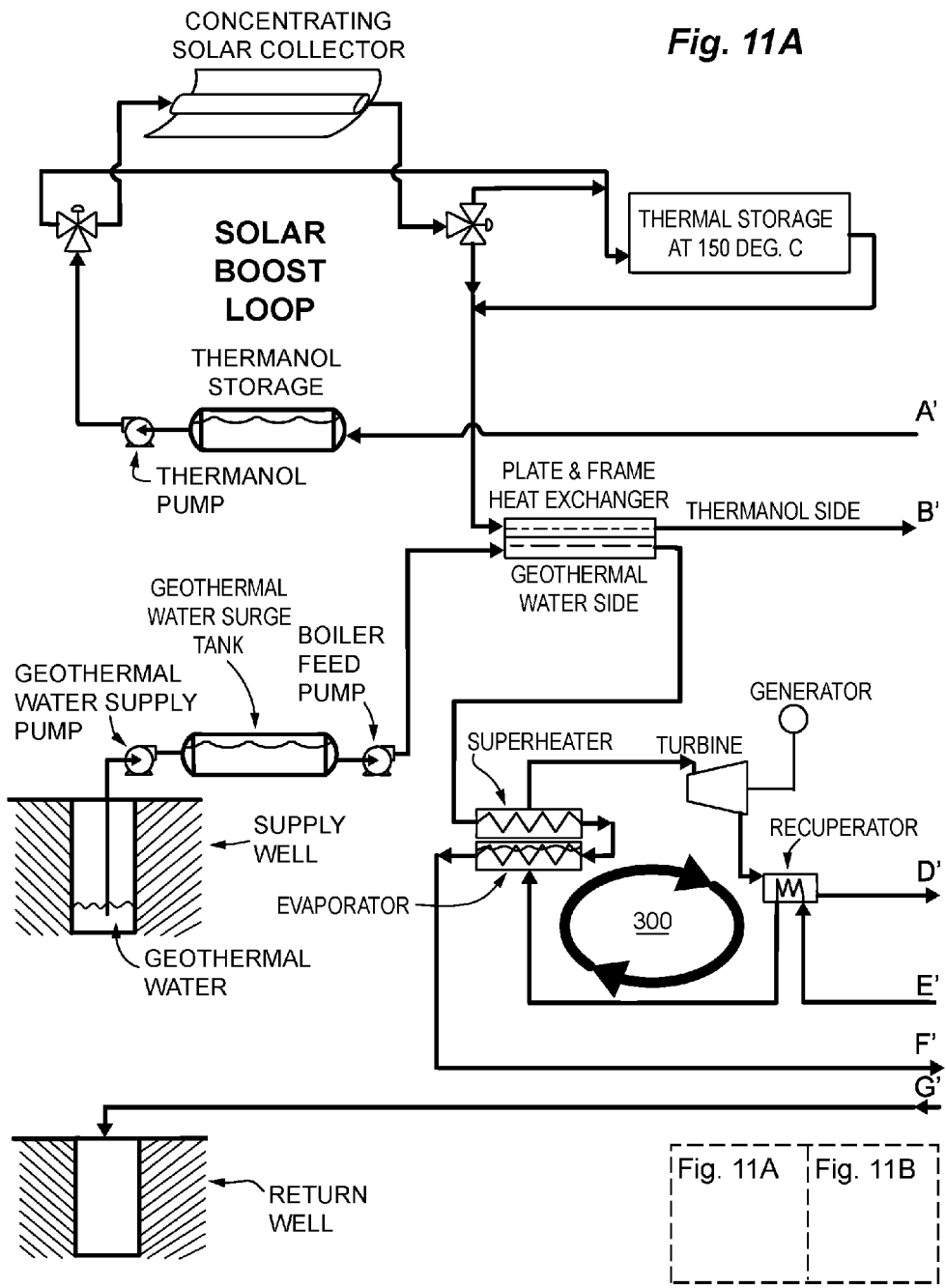
FIGS. 11A and 11B are schematic views of a thermal chimney with combination waste heat thermal stack and turbine driven by a Rankine Cycle.
Figure 11B:
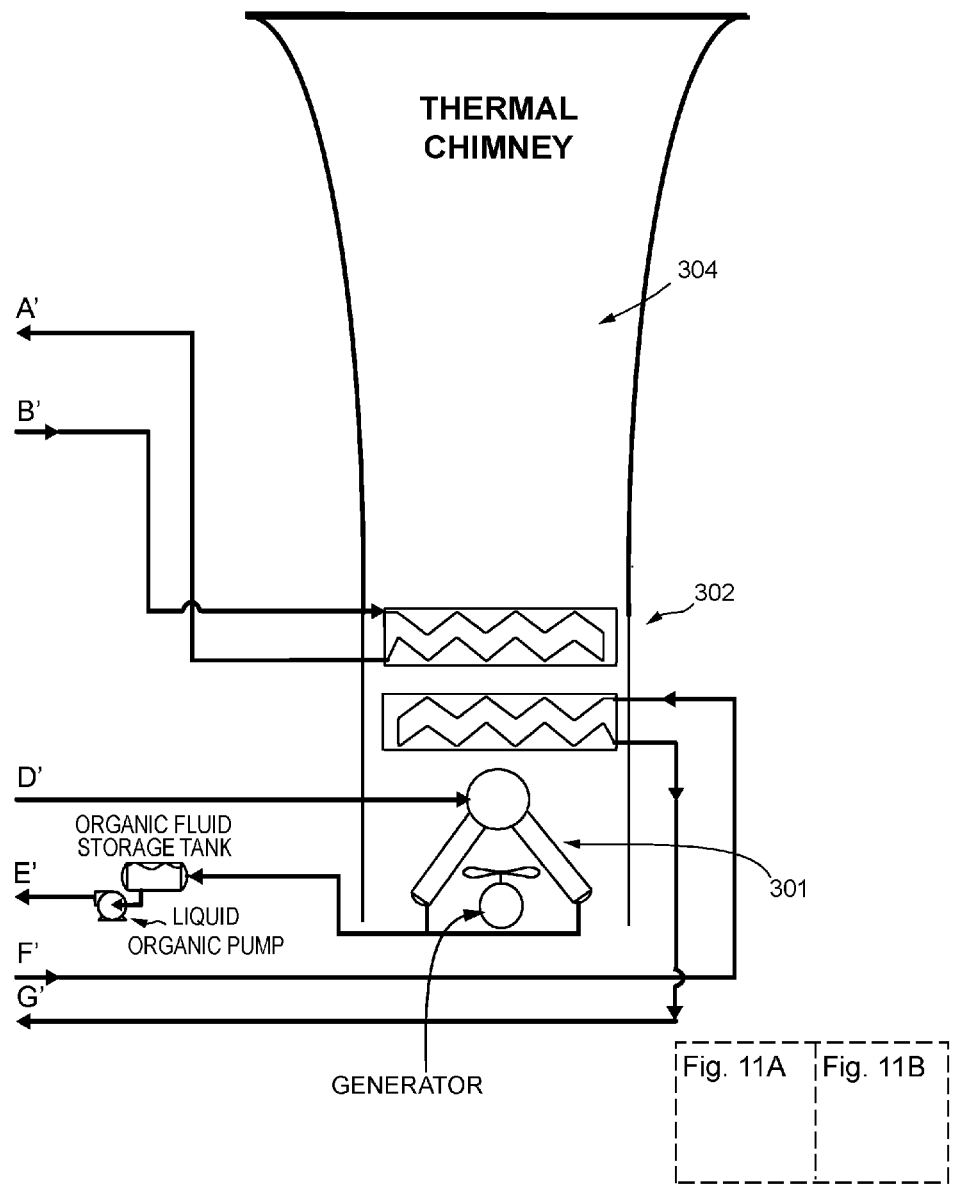

FIG. 10C models a combined RC system with geothermal loop (shown in FIG. 7), solar boost (shown in FIG. 9B), and heat sink having a thermal stack (302) and thermal chimney (304) in FIG. 11B. This additional heat extracted from the brine and solar loops drives additional natural convective draft in a thermal chimney that can further improve condenser operation of an RC, and also can turn an air turbine to generate electricity that may be used to power pumps and accessory process equipment. In this case, additional geothermal brine and solar working fluid cooling is achieved, driving the air coolant to a higher chimney exit temperature. This diagrammatic model is used in design of the combined plant of FIGS. 11A-11B.

FIGS. 11A-11B show a combination of the above mentioned concepts with the addition of a thermal chimney in place of the traditional forced convection cooling tower. As mentioned above, by using the solar boost technique, the amount of geothermal heat used in the RC cycle (300, Organic Rankine Power Cycle Loop) is reduced, and with enough thermal boost becomes essentially zero or negative; i.e., the solar/auxiliary heat replaces the usable geothermal heat, and at an extreme will lead to pumping solar/auxiliary energy into the geothermal field. This brings up the need for a better use of the waste heat in the exhaust from the RC (after being used in the RC boiler). The thermal chimney (304) can provide that useful heat sink and surprisingly, can lead to improved overall energy production for the ORC facility, and reduce parasitic energy losses.

Figure 12:
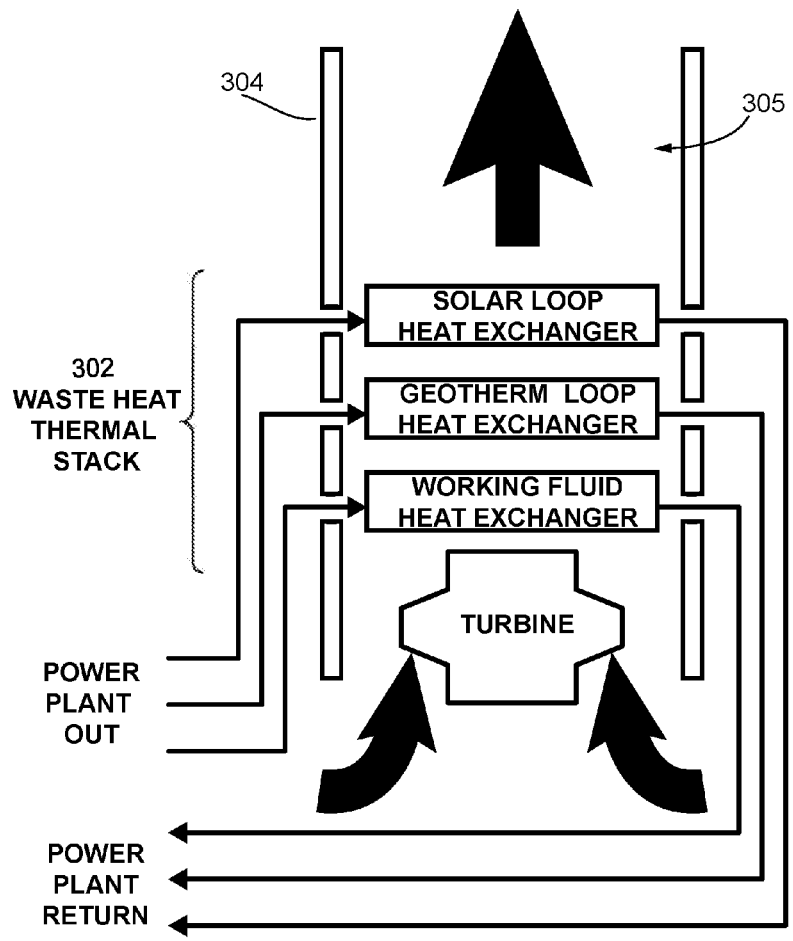
FIG. 12 is a schematic view of another embodiment of the invention, showing a combination waste heat thermal stack with turbine in a central channel of a thermal chimney.

The concept is based on the principle of natural circulation of hot air; rising and being "pushed" up a central channel of chimney (304) by denser air at the base of the chimney. As "draft" flow develops, a suction pressure forms within the chimney, and flow velocity increases, adding momentum to the rising air column. What develops is a high velocity flow of colder air entering the base of the chimney, that air receiving the waste heat from the heat engine (generally in an air-cooled condenser), and then less dense, heated air rising up and exiting at the top of the chimney. This eliminates the need for a forced air blower to cool the condenser and surprisingly, the momentum achieved by dimensioning the chimney for the mass flow can be used to turn a secondary turbine as shown in FIG. 12 that can power the pumps used in recirculating the brine, for example, thus eliminating parasitic energy losses of operating the system and improving overall efficiency of energy capture.

Optionally the secondary coolant loop may be eliminated and the working fluid may be routed directly into a condenser at the base of the cooling tower. As shown in FIGS. 11A-11B, the working fluid condenser is mounted at the base of a "thermal stack" topped with heat exchangers from the geothermal loop and the solar/auxiliary heat loop. The heat exchanger used for the solar/auxiliary heat loop is mounted at the highest level of the thermal stack (302) because it will be the hottest member in the thermal stack during the most extreme operating conditions at peak insolation. The geothermal heat exchanger, which serves to reduce $T_{OUT}$ of brine before injection back into the geothermal substrata, is shown mounted in the middle between the solar/auxiliary heat exchanger and the condenser. This thermal stack (302) is a technical feature constituting an advance in the art, and manipulates the potential of the system to extract additional energy in the form of work while also being used to control and limit the back out temperature of brine being recirculated through the underground percolating magma bed. This allows maximum utilization of the geothermal resource, while providing adequate temperature to the ORC boiler for effective operation and protecting the geological feature for sustained use.

Now in more detail, in a first apparatus for this method of operating a G-ORC, a conventional air-cooled condenser is housed/shrouded at the bottom of the thermal chimney. The heat removed by this condenser heats the air rising through it. This temperature difference will make the discharge air from the condenser less dense (lighter) so that it will tend to rise, drawing replacement air from underneath. This effect can be augmented by adding heat from the geothermal loop after it leaves the RC boiler, which will in effect increase the geothermal heat being used by the plant. From a practical point of view, the heat removal from the geothermal well is now much greater and is only limited by the temperature at which brine minerals precipitate (plate out on the piping). With suitable engineering, heat backed out from the geothermal loop will now drive passive, convective energy production in the thermal chimney so that overheated brine is not injected back into the geothermal bed, thus turning a potential problem into an advantageous solution for gaining more useful energy from the system. Advantageously, the natural convection cooling tower of FIGS. 11A-11B becomes a power plant of its own.

Also the differential temperature of the solar loop can be increased and more heat can be drawn from the solar collectors. Typical heat transfer fluids for the solar loop can be operated at low temperatures in the return line without pipe fouling issues and efficiency increases as $T_{IN}$ is reduced.

In some embodiments, traps for collecting sediments formed in cooled brine are provided, thus overcoming the prior art problem of $K_{sp}$ versus temperature entirely. Traps are cleaned or replaced periodically, and in some instances the collected minerals are of value, such as lithium, bromine, calcium, or borate salts. Also of value are rare earths captured in the precipitates. Sediment traps maybe placed in the geothermal evaporator assembly, within the thermal stack, or downstream in the return loop to the return well.

By stacking a plurality of heat exchanges at the base of the thermal chimney, these additional heat sources will further increase the chimney suction or draft effect of the cooling tower. With an adequate height, these convectively-driven effects can produce an air flow useful to turn a "horizontal windmill" at the inlet of the tower and generate additional electric power.

Synergically, coupling energy production by natural convective cooling to an ORC power plant enables the geothermal source to be fully utilized even when the working fluid temperature in the boiler is being augmented/boosted/supplemented by other heat sources (i.e. solar collectors, fuel fired heaters, thermal storage devices, etc.) in series or in parallel.

This synergy also improves the early morning performance of the system, because the lowest temperature of the ambient air is just prior to sunrise. Not only does this cooler air improve the performance of the ORC generation cycle (by a better working temperature difference), but it provides a better potential for the thermal chimney, because the colder morning air is denser and when heated to the same chimney discharge temperature the draft driving density difference $\Delta\rho$ will be maximized. This also helps synchronize energy production with demand. In some locales, a significant energy demand is for the "morning wake up/fixing breakfast" which typically is prior to the solar boost being available, the thermal chimney effect along with appropriate thermal and other energy storage will allow the operation to better meet the user morning power needs.

Figure 15A:
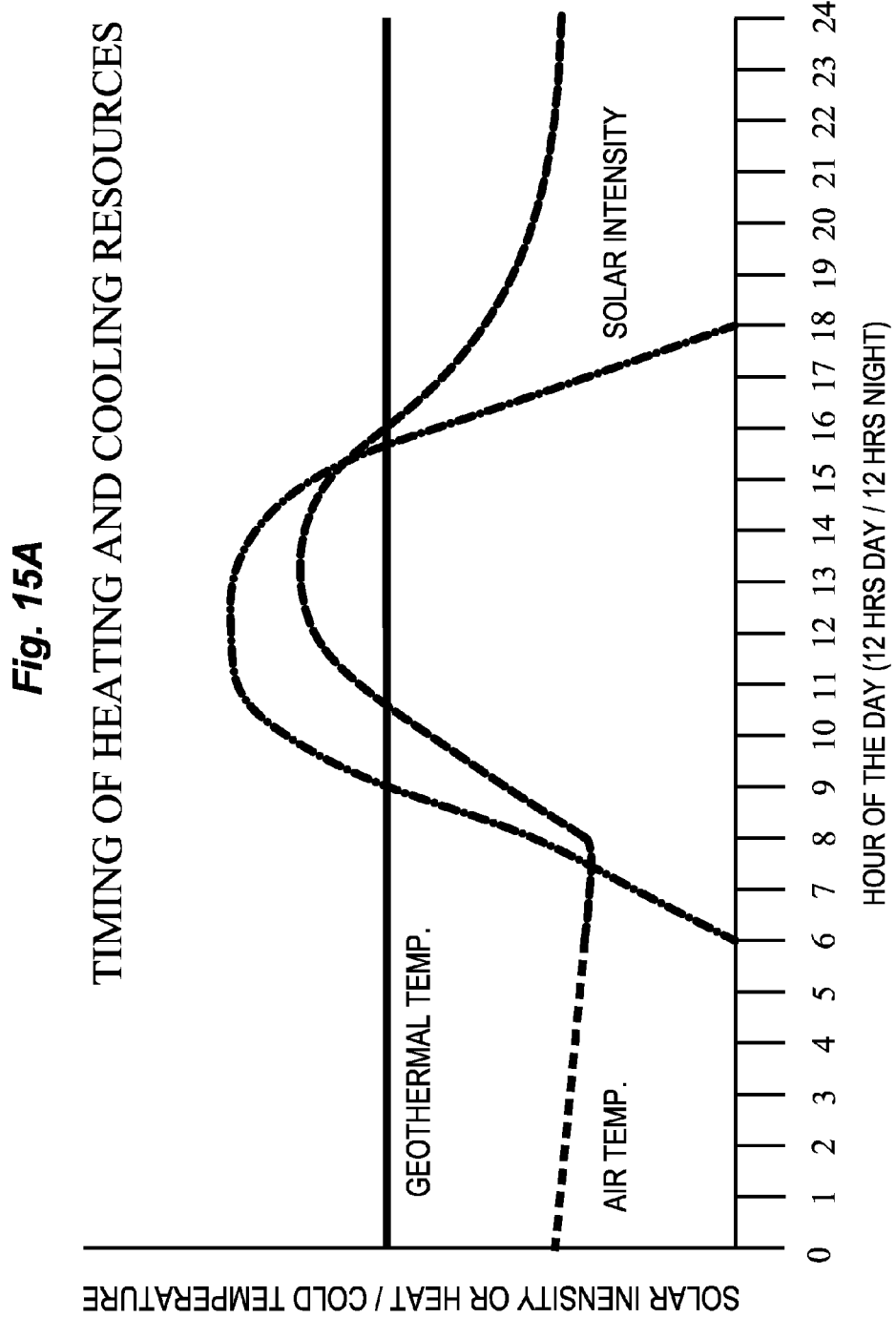
FIG. 15A is a plot of operating temperatures and solar intensity in a dual loop system having a constant temperature geothermal heat source, a diurnally variant solar collector heat source, and a diurnally variant air cooling source.
Figure 15B:
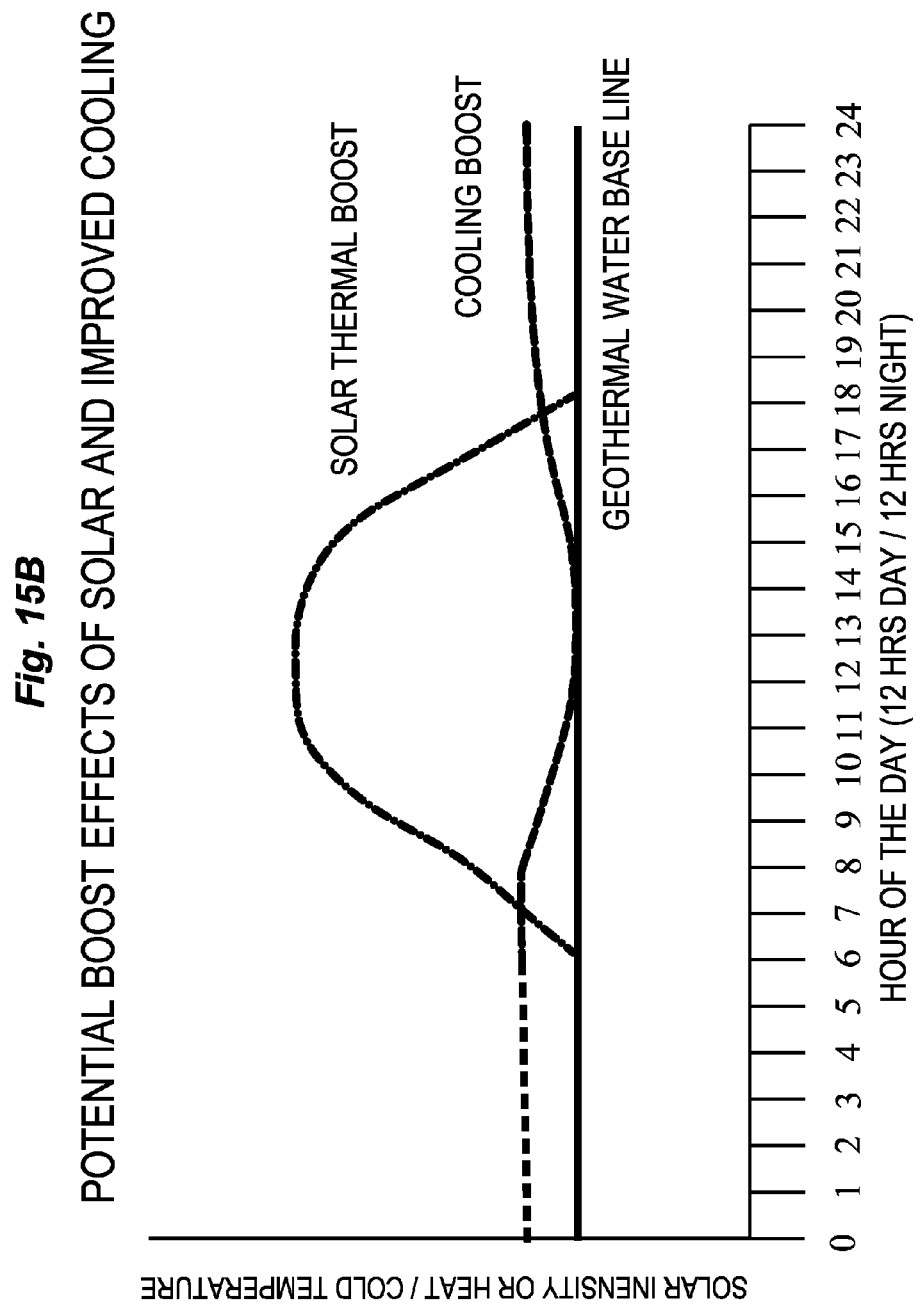
FIG. 15B illustrates potential for combining these enhanced heating and cooling capacities so as to achieve additional heat engine power output.

Also shown in FIGS. 11A-11B is the addition of thermal storage in the solar boost loop. Ideally a power production facility should be able to follow the load cycle of the attached users, especially if it's a dedicated facility, so as to avoid having to buy additional power, and/or be forced to operate at reduced capacity. FIG. 15A shows a hypothetical power user needs, and the stacked geothermal, solar, cooling power generation capabilities. During the peak solar part of the day (described in more detail in FIGS. 15A-D), part of the solar energy (heat transfer fluid flow) may be routed through a unit that can absorb and store this heat for later use. The remaining flow combines with the discharge of the storage and is routed to the ORC boiler and electric power is generated as before. But, after the solar energy collectors are no longer effective (i.e., after sundown), the solar recirculating fluid loop may bypass the solar collectors and be routed through the heat storage unit so as to continue to operate the solar boost cycle during hours of the day better synchronized with peak loading as shown in FIGS. 15A through 15B. This will allow the stored heat and/or an auxiliary heater loop to continue to provide a temperature boost to the geothermal brine and produce additional power. By selecting the timing and intensity of this thermal storage boost circulation, the electric production of the basic ORC can be altered to better match the electricity user requirements. This provides for better utilization of the equipment and improves the economics for electricity production. For example, while not limited thereto, various eutectic salts and passive thermal mass technologies have been developed for storing thermal energy in both passive and active solar heating systems and one skilled in the art will be capable of adapting various thermal storage technologies to extend the availability of heat into the late hours of the day when electricity is most likely to be in demand. Thus the systems of the invention have yet another advantage in distributing energy production to better match energy demand.

Thus the invention, in these embodiments, is an apparatus for concentrative desalination of a geothermal brine from a supply well of a geothermal field while controlling the temperature, saturation and phase separation of the brine so as to separately collect power, fresh water and a mineral concentrate. The apparatus includes: (a) a thermal chimney configured as a heat sink, the thermal chimney having a base, a top, and a central airway with surrounding wall, wherein the base is defined by a bottom cool air inlet to the central airway, the top is defined by a heated air outlet from the central airway, and the central airway is configured for conducting an exergy driven air stream rising from the bottom cool air inlet to the top heated air outlet thereof, the rising air stream having a mass flow, a momentum, and a dew point dependent on temperature and pressure therein; (b) a Rankine Cycle engine configured to recirculate a working fluid in a loop through a turbine generator, the turbine generator having an output of electrical power; (c) a superheater configured to contact a geothermal brine input with the working fluid upstream from the turbine generator; (d) a boiler configured to thermally contact the geothermal brine input with a liquid boost stream input upstream from the superheater; the liquid boost stream input having a heat content for driving increased power output from the Rankine Cycle engine; (e) a stack of heat exchangers in the central airway at the base of the thermal chimney, one heat exchanger configured to receive and convey the geothermal brine discharge from the superheater, one heat exchanger configured to receive and convey the liquid boost stream discharge from the boiler, and one heat exchanger at the bottom of the stack configured as a condenser to receive and condense the working fluid from the Rankine Cycle engine when thermally contacted with the rising air stream, the stack of heat exchangers defining a thermal stack; (f) an evaporator collector assembly disposed above the stack of heat exchangers, wherein the evaporator collector assembly is configured to fluidly contact the geothermal brine discharge with the air stream rising in the central airway, and evaporatively cool the geothermal brine to a temperature below the solubility product of at least one mineral salt dissolved therein, thereby precipitating the mineral as a solid mineral fraction, the evaporator collector assembly having an output of the solid mineral fraction and a supernatant discharge therefrom; (g) a condenser zone proximate to the top of the thermal chimney, the condenser zone having an axial cyclone with inlet guide vanes configured to decompress and cool the water vapor in the rising air stream below the dew point thereof, thereby forming a fresh water condensate for collection therefrom; (h) a receiving channel circumferentially disposed on an inside wall of the thermal chimney, wherein the receiving channel is configured to collect the condensate from the axial cyclone and fluidly convey fresh water to a collection reservoir; (i) a pump for injecting the supernatant discharge and the geothermal brine discharge into a return well in the geothermal field.

A solar collector or a fuel-combustion auxiliary heating unit operation may be placed upstream and configured to heat a liquid boost stream upstream from the boiler so as to boost heat going in to the Rankine Cycle engine.

The thermal stack is generally configured to recycle heat but also to control the temperature of any brine and supernatant discharge being injected into a return well for recirculation through a geothermal field so as to protect future production capacity of the field.

Generally, the evaporator collector assembly is configured to evaporatively cool and precipitate a solid mineral concentrate from the geothermal brine and then to adjust the temperature of a supernatant discharge before injection of the supernatant discharge through a return well back into the geothermal field, the discharge percolating from the return well to the supply well as a sustained fluid loop.

For promoting condensation, the thermal chimney may include an axial cyclone with inlet guide vanes proximate to the outlet therefrom, the axial cyclone driving condensation of fresh water evaporated from the geothermal brine during precipitation of the solid mineral concentrate in the evaporator collector assembly.

The apparatus generally comprises a spray system configured to spray the geothermal brine onto a mineral capture assembly, evaporator tray, or sediment trap, positioned above the thermal stack such that the rising air stream and any evaporated water vapor is driven to rise convectively up the central airway and the brine is evaporatively cooled in the mineral capture assembly below a solubility product such that dissolved minerals are Advantageously, the mineral fraction captured in this way may include one or more minerals selected from lithium, bromine, calcium, borate, and rare earth salts that may be a solid mineral concentrate suitable for refining.

More generally, the apparatus may be configured for collecting a mineral precipitate from a geothermal brine drawn from a supply well, which comprises a thermal chimney with cool air inlet at a base and heated air outlet at a top, the thermal chimney having at the base a stack of heat exchangers configured as a heat sink and an evaporator collector assembly, wherein the thermal stack is thermally contacted with an air stream rising in the thermal chimney from the inlet to the outlet, and the evaporator collector assembly is disposed proximate to and above the thermal stack and is fluidly contacted with the geothermal brine entering the thermal chimney.

FIG. 12 details a schematic view of a thermal chimney (304) with combination waste heat "thermal stack" (302) and air turbine. The chimney is represented as a concrete pipe shown in cross-section with central channel (305) and is cut by three fluid loops, one for the solar collectors, one for the geothermal brine, and one for the working fluid in the RC heat engine. Within the chimney, three heat exchangers are shown. Generally, the RC working fluid heat exchanger (the condenser) is placed at the bottom of the stack so that it receives the coolest air drawn in at the base of the chimney. The solar loop will have the highest black body temperature during the heat of the day and is thus placed at the top of the stack in this example. The geothermal loop is placed at an intermediary position. In alternative designs, the heat exchangers may share surfaces and supporting structure, in other designs a more open circulation is desired and the heat exchangers are separated by well-defined air channels having low flow resistance. Each heat exchanger may have vertical elements as well as horizontal elements, and in other instances, the heat exchangers are mounted concentrically or even helically to support organized air flows within the chimney. Thus the figure is purely schematic and is not intended as a blueprint for construction. Design of heat exchangers is a conventional art, and those skilled in the art are referred to references such as Perry's Chemical Engineers' Handbook for a review of the available technologies.

Figure 13:
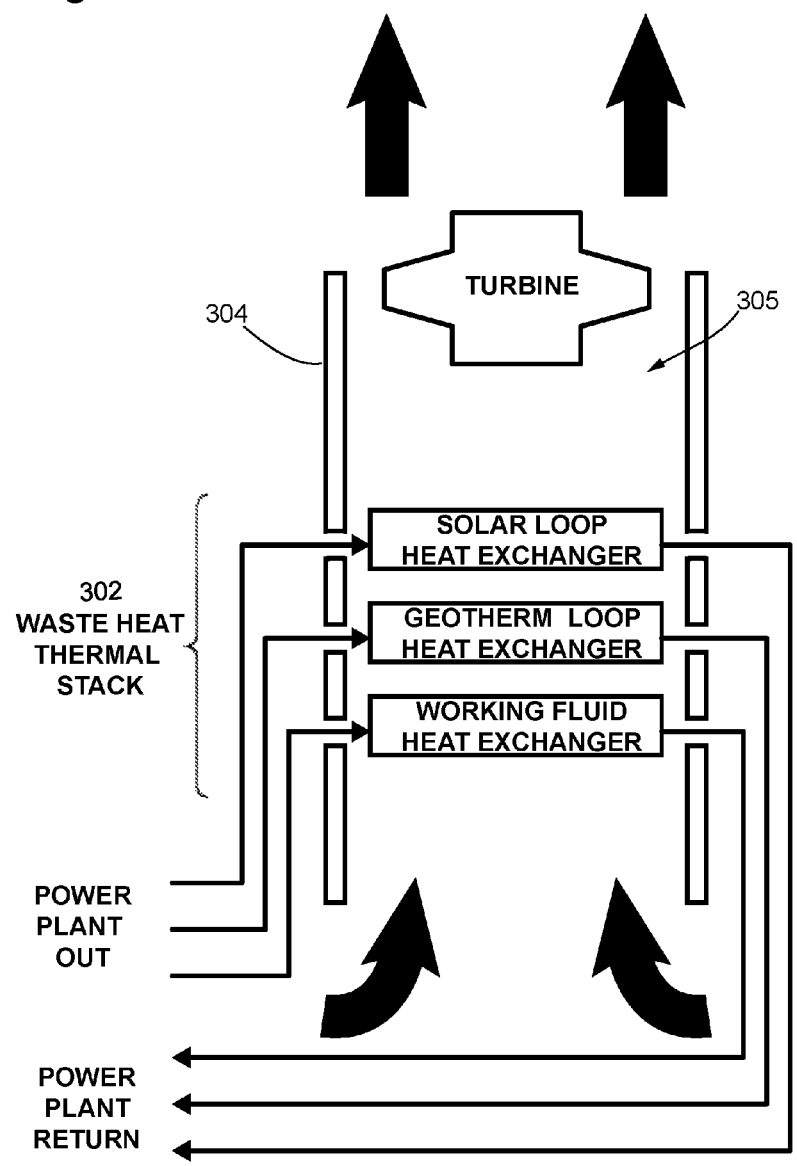
FIG. 13 is a schematic view of a power generation system having yet another embodiment of a thermal chimney with thermal stack and superiorly positioned turbine.

As shown here, the turbine is mounted concentrically at the base of the thermal stack. Turbines may be axially mounted as shown, or may be mounted with an axle transverse to the bulk air flow if desired. Turbines may also be mounted above the thermal stack as shown in FIG. 13, which is a schematic view of a second embodiment of a combination waste heat thermal stack with turbine. Use of axially mounted turbines above the thermal stack will influence and impact angular momentum to the air flow exiting the turbine blades. This conversion of linear momentum to angular momentum can have a complementary effect to the thermal chimney. Design and operation of turbines and their coupling to electrical generators is well known in the art and one skilled in the art is referred to reference books on the subject for working blueprints and construction details. Two turbines may be used if desired, one above and one below the heat exchanger stack, where the downstream turbine converts linear momentum into angular momentum.

Figure 14:
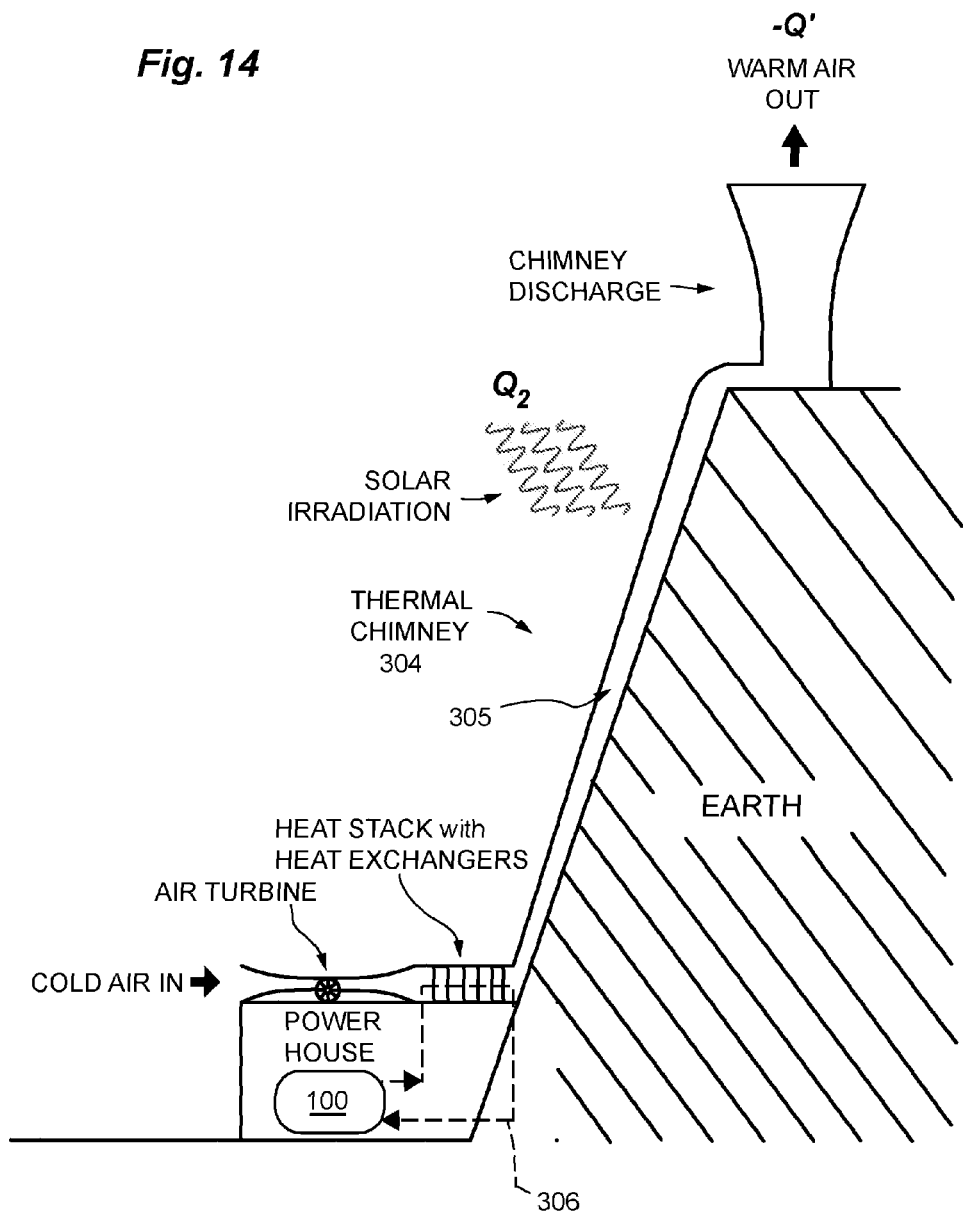
FIG. 14 is a view of an extended thermal chimney with central channel for receiving solar irradiation and generating an improved passive air draft, such as for driving a turbine.

FIG. 14 relates to yet another embodiment of the inventive concepts. In this drawing, a power house containing a heat engine (100) is operatively coupled to an air-cooled heat exchanger through a cooling loop, indicated here by a dashed line (306). This cooling loop is equivalent to loop (100) in FIG. 1, and loop (113) in FIG. 2 through FIG. 4. The fluid circulating through the cooling loop(s) may be brine, water, or working fluid. Working fluid may enter the cooling loop as a vapor and be condensed therein. Several such cooling loops may be employed as described in other systems exemplifying the invention (as shown in FIGS. 11 and 12, and schematically in FIG. 2 through FIG. 4) so as to form a thermal stack of heat exchangers shrouded within the base of a thermal chimney. FIG. 14 shows a system supported against an earthen support or other buttressing structure. In operation, the discharge at the top of the thermal chimney represents the flow of heat (−Q') as an open loop in which replacement air enters at the bottom of the chimney at a mass flow rate equal to the heated air mass flow rate exiting the top. The draft created by natural convection powers an air turbine, shown here upstream from the thermal stack of heat exchangers. It should be understood that the thermal chimney may be mounted on top of a solar collector surface which may occupy dimensions of height and width and length on the supporting surface, and is thus not limited to pipe-like cross-sections. Rectangular, ovoid, triangular, trapezoidal, and conical tubulations are also contemplated. In certain installations, a plurality of thermal chimneys will be installed on top of an array of parabolic solar collectors arrayed on a hillside; in other instances, a sheet of highly light absorbent and heat conductive material (such as carbon black) will be formed on a slot-shaped solar chimney having a depth configured for free flow of rising air and a width and length selected to optimize the suction pressure that develops when heat from the heat exchangers at the base of the chimney plus heat from solar insolation ($Q_2$) striking the sheet of solar absorbent material causes a convective air flow up the chimney stack and out a discharge vent at the top. A variety of designs are contemplated having the advantage of further increasing draft flow in the chimney In operation, outside air enters the chimney at the base in response to the suction pressure that develops as hot air rises in the chimney. While not limited to this particular arrangement, the replacement air powers an air turbine before encountering the heat exchanger stack. Power from the air turbine is used to replace other power supplies that would conventionally be used to operate pumps and other on-site equipment for operation of a G-ORC, for example.

Although the thermal chimney operates to extract waste heat from the system, we believe it is best analyzed as an exergy-driven energy capture system, which may include input of solar heat to accelerate the draft flow, and has a substantial entropy component. This thermal chimney and thermal stack combination is thus distinct from the conventional forced air cooling towers and RCs of the prior art. The thermal chimney is an open type power cycle, where ambient air is pulled into the bottom of the chimney and discharged back to the atmosphere at an elevated discharge such as shown in FIGS. 8A-8B, and FIG. 11 through FIG. 14. In this respect the conditions of the ambient inlet and discharge ($T_0$, $p_0$, $z_0$, and composition) also affect the performance of the unit. In particular, how the energy (as exergy) of the discharge is directed as a momentum flow out of the tower, (for example, as a divergent discharge, or as a vortex/spiral, and other geometries) is a factor in design, and controls the design of the heat exchangers and condensers of the thermal stack and the turbine or turbines disposed in the chimney.

FIG. 15A is a plot of operating temperatures and solar intensity in a hybrid geothermal and solar heat engine system having a constant temperature geothermal heat source, a diurnally variant solar collector heat source, and a diurnally variant air cooling source. FIG. 15B illustrates the boost effect of the solar heating at midday, and the cooperative effect of night time cooling when a thermal chimney of the invention is employed.

Figure 15C:
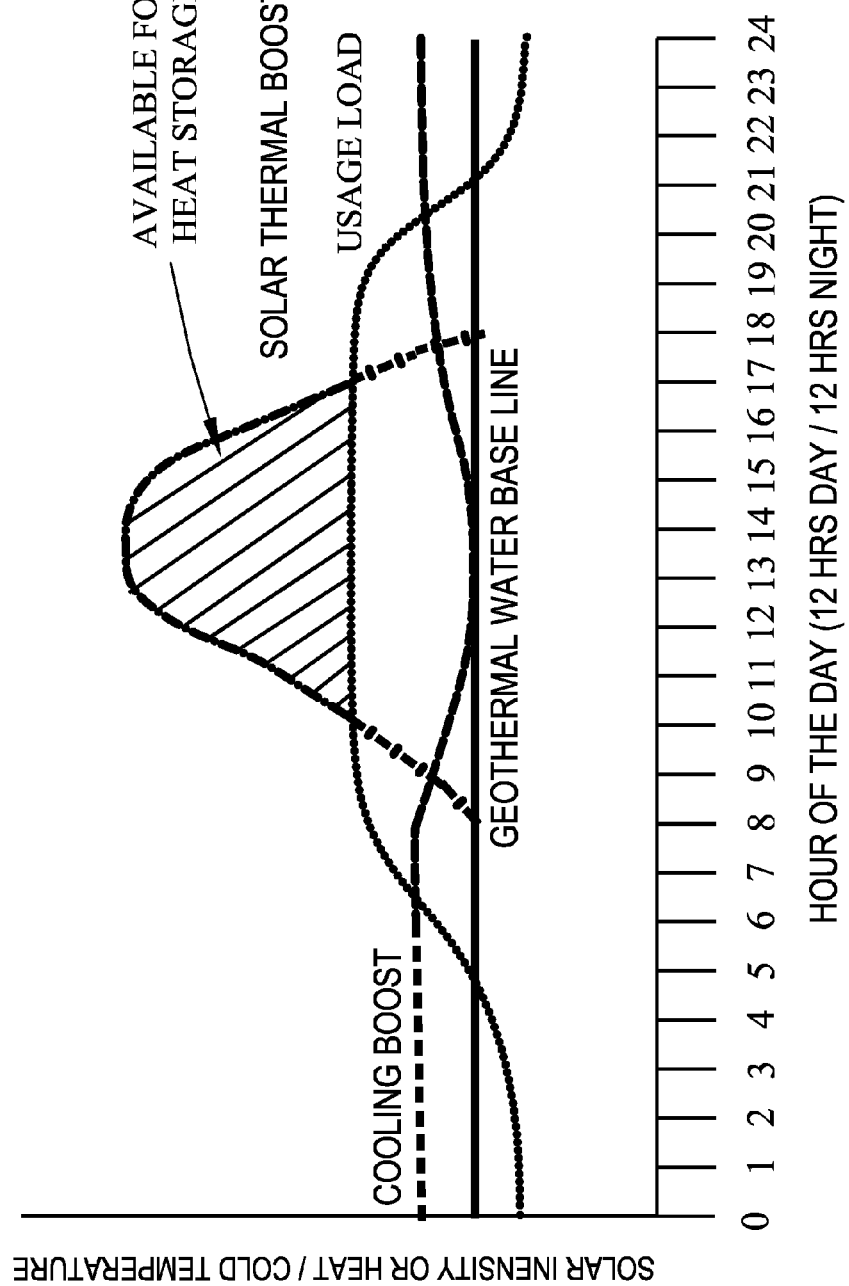
FIG. 15C is a plot of operating temperatures in a solar boost cycle showing daily variations in load.

FIG. 15C shows power load superimposed on a plot of operating temperatures in a solar boost cycle. User load peaks between 6 AM and 9 PM whereas solar insulation peaks between about 9 AM and 4 or 5 PM. Thus there is a mismatch between the power draw (user's needs) and the output from a geothermal/solar plant operated under the kind of hybrid conditions needed for exploiting lower-quality geothermal resources without thermal storage. To better match available power to demand, FIGS. 15A-14D includes thermal storage capacity as indicated schematically in FIG. 11A (thermal storage). The hatched area represents the energy available for storage and later use. FIG. 15D is a plot of operating temperatures showing the use of thermal storage capacity to better match energy generation to daily variations in load. Excess heat, when available, is shunted into thermal storage and is returned to the RC feed when needed in the early morning and evening (shown with cross-hatching). This reserve benefits from the cooler air available in the morning and evening for operating the thermal chimney and heat sink. In all instances, geothermal brine is operated so that excess heat is not injected into the geothermal bed where damage to the rock structures may ensue.

In this way, the daily "availability" of the potential energy sources and sinks are coordinated with the flow of geothermal brine. During the day, concentrating Solar Collectors (CSCs) are used to thermally "boost" the geothermal supply well temperature, as is needed to harvest marginal geothermal resources profitably. (Parenthetically, cooling systems can be used to cool PV systems also in integrated systems.) Because the timing of this hybrid geothermal-solar heat source is not synchronized to the energy demand of most power users, potentially reducing the effectiveness of hybrid solar/geothermal power generation, any improvements to better match power generation with demand are advantageous. By combining ("stacking") the solar heat on top of the fixed geothermal heat, a peak power capability is created starting a little after "sunrise", and ending a little before "sunset". The benefit of the natural convective cooling tower performance is best just before sunrise when the air is coldest and again in the evening. This natural variation in ambient air temperature is used in the inventive thermal chimney to improve performance of the RC in the morning and evening. Thus the systems of the invention have yet another advantage in distributing energy production to better match energy demand.

Figure 16A:
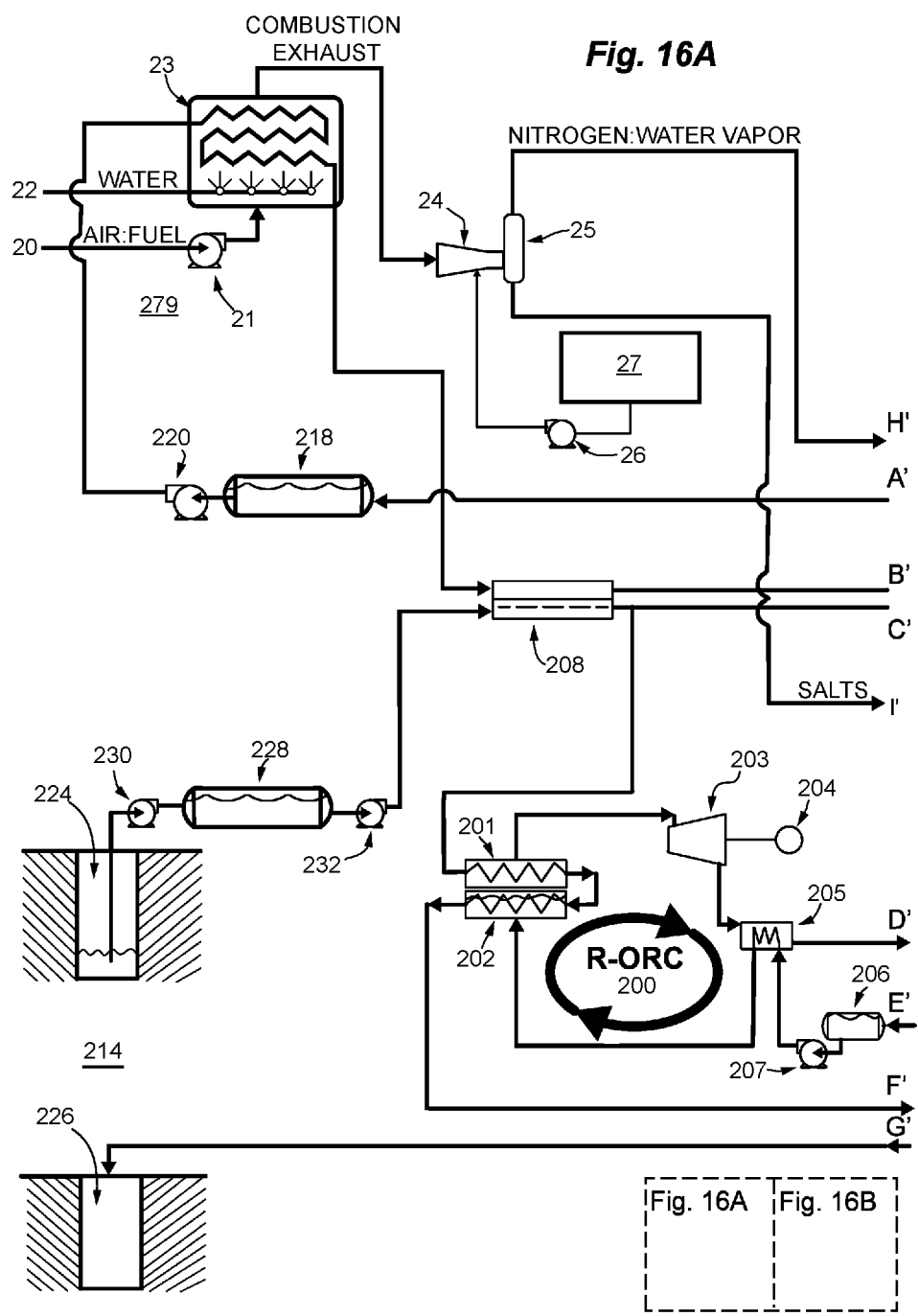
FIGS. 16A and 16B relate to an auxiliary heating unit operation and scrubber operating to increase the geothermal fluid temperature, ORC power and water outputs from the thermal chimney, without significant carbon dioxide entering the atmosphere; the carbon will be sequestered as a carbonate and returned underground with the recycled geothermal water.
Figure 16B:
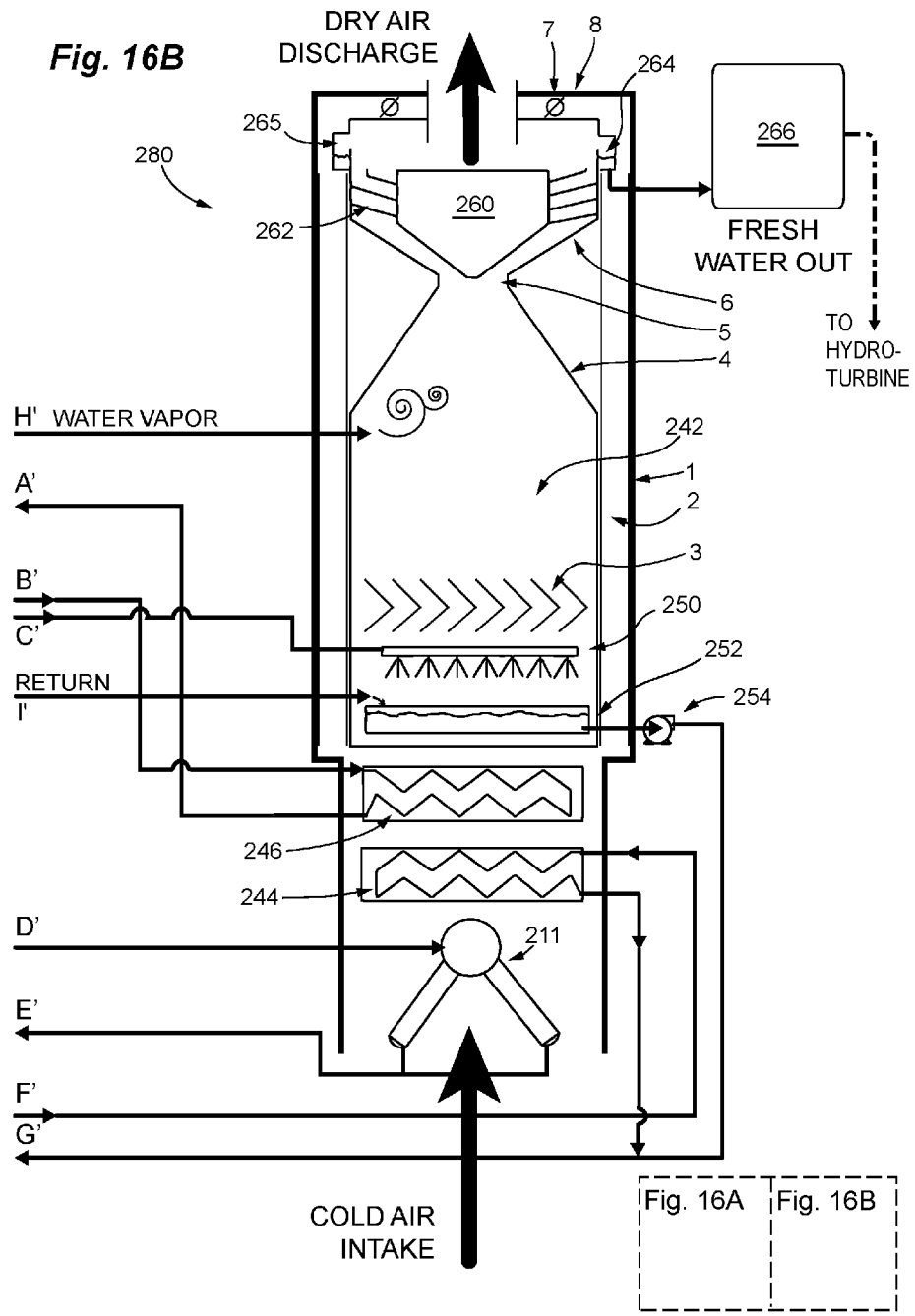

FIGS. 16A and 16B describe an auxiliary heating unit (23) that may supplement or replace a solar collector for heating a circulating working fluid. In a revised drawing (compare with FIGS. 8A-8B, like elements are labeled with like indicia), an auxiliary fuel-fired heater is shown that replaces the parabolic solar trough depicted earlier. The purpose is identical however: to heat a circulating working fluid pumped through the auxiliary heating unit (23) from reservoir (218) and providing heat to the geothermal water via plate exchanger (208), and then to the heat exchanger stack (246) at the bottom of the chimney (1). Fuel (at 22) is piped into a fuel header equipped with fuel atomization nozzles, and combustion air (at 20) is introduced through forced draft blower (21) into the heater (23) firebox where combustion of the fuel heats the tubes containing the circulating heat transfer fluid.

The combustion exhaust contains mainly nitrogen, carbon dioxide and water vapor. For nethane fuel, two moles of water are formed for each carbon molecule oxidized to $CO_2$. The partially-cooled exhaust is processed through a Venturi scrubber (24) where it contacts a scrubbing fluid (e.g. potassium hydroxide, sodium hydroxide, ammonium hydroxide, other caustic, etc.) from reservoir (27) via metering pump (26). The heater off-gas is processed through a dis-entrainment chamber (25) where the scrubbing liquid leaves the bottom and the moist nitrogen exits the top. The carbon dioxide will be trapped as a carbonate salt in the liquid phase. The liquid phase from the separator goes into the thermal tower just above the collection tray (252) via stream I' while the separator off-gas (stream H') enters the thermal tower (280), (as modified here) above the evaporator section into the low velocity riser section (242), but below the swirl inducer (4) and joins the rising moist air entering the swirl inducer (4), then passes through the agglomeration throat (5) and through the axial cyclone (6, 260, 262) as before. Streams H' and I' are new—adding heat and water to the fresh water condensation operations. Thus the auxiliary heating unit is useful for meeting peak power demand by increasing the geothermal water temperature into the R-ORC, for increasing reserves of stored fresh water (266) for future power demand, and for conditioning (increasing the pH) of the concentrated geothermal water (stream G') being injected back into the percolating underground channels of the geothermal field, and includes provision for capturing $CO_2$. The $CO_2$ is useful in forming carbonates of metals contained in the ground water feed.

The following unit operations components are identified in the drawing by indicator number: (20)—combustion air intake to blower; (21)—combustion air blower; (22)—auxiliary fuel inlet to the heater burners; (23)—auxiliary heater with tubes to heat the recirculating heat transfer fluid; (24)—Venturi scrubber/contactor; (25)—scrubber phase separator; (26)—scrubber solution metering pump; (27)—scrubbing solution supply tank.

Depending on the temperature range of the geothermal water supply, this auxiliary heater may be used for a minimal increase of 10 to 20° C. or can be a more significant part of the heat energy input as needed to heat the geothermal water enough to allow flashing of steam and support a more aggressive power cycle (such as a combined steam and ORC cycle, not shown in this example). The combustion exhaust (with the $CO_2$ removed) will be sent to the thermal tower where its heat and moisture will be added to the moist air flow entering the swirl induction zone (4). The carbonates in the return stream I' will be combined with the evaporation zone water on the collection tray (252) and pumped back to the return well at an optimal temperature and in an unsaturated condition; thus disposing of the fossil-fuel-derived carbon along with the returning geothermal water. Thus the auxiliary heating unit is a synergic and beneficial unit operation in ensuring power supply according to cyclical demand and in improving geothermal field management (solving a longstanding problem, that of damage that results from returning supersaturated brines to a geothermal field). Advantageously, reclaimed waste water, brackish water, and seawater can be used without limitation thereto and in some instances, the apparatus and its variants described here can serve to supply fresh water for a variety of needs such as in agriculture and so forth. The reservoir or pond (266) can also be fitted with a hydroturbine to generate power on demand.

Return of supersaturated brines to a geothermal field can result in rapid deterioration of field capacity and the need for drilling new wells. In the invention, hot brine from the field is used to drive a Rankine Power Cycle; the brine is then sent through a sprayer and excess heat is evaporated to produce a stream of "essentially distilled" water for collection, the brine in the same operation is allowed to cool and salts to crystallize so as to equilibrate and if reheated slightly by the solids extraction process will produce under-saturated brine for reinjection through a return well in an under-saturated state for permeation into the geothermal field, serendipitously eliminating the need for disposing of spent brine and avoiding clogging of the return well and its draining sinuses with precipitates from the injectate.

It is to be understood that the inventions, examples, and embodiments described herein are not limited to particularly exemplified materials, methods, and/or structures. Further, all foreign and/or domestic publications, patents, and patent applications cited herein, whether supra or infra, are hereby incorporated by reference in their entirety.

The terms and expressions that have been employed in the foregoing specification are used as terms of description and not of limitation, and are not intended to exclude equivalents of the features shown and described. While the above is a complete description of selected embodiments of the present invention, it is possible to practice the invention using various alternatives, modifications, adaptations, variations, and/or combinations and their equivalents. It will be appreciated by those of ordinary skill in the art that any arrangement that is calculated to achieve the same purpose may be substituted for the specific embodiment shown. It is also to be understood that the following claims are intended to cover all of the generic and specific features of the invention herein described and all statements of the scope of the invention which, as a matter of language, might be said to fall therebetween.

EXAMPLE I

Klamath Falls is not far from Crater Lake (formerly Mt. Mazama) in Oregon and rests on a large geothermal field having many wells operated to extract heat for residential use. The outlet temperature of brine from these wells is generally insufficient to economically produce electrical power. Oregon Institute of Technology (OIT) has built a 280 KWe geothermal cogeneration plant helps power campus operations and also heats the campus. The power plant runs a turbine on a G-ORC cycle with R245fa as the working fluid. The heat engine is a Model 280 PureCycle (Pratt & Whitney Power Systems) and has been operated since 2008. Retrofitting the existing system with a solar boost engineered as described in FIG. 10B (a boost of 20° C.) is shown to result in a greater than 10% increase in electric power from the plant. By use of the inventive thermal chimney and thermal stack improvements described in FIG. 10 or 13, additional increases in heat utilization are obtained by increasing overall RC ΔT. In new system installation, higher levels of improved performance are achieved by optimum equipment arrangement and implementation, including changing the working fluid, and using a multi-working fluid/multi-turbine technique.

While the above is a complete description of the preferred embodiments of the present invention, various alternatives, modifications and equivalents are possible. These embodiments, alternatives, modifications and equivalents may be combined to provide further embodiments of the present invention.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like. Many of these modifications and alternatives will be dictated by the site specifics: geothermal flow and temperature available from the geothermal source, as well as the local topology and building structural limitations such as soil—bedrock load bearing capability, etc., as will be appreciated by one skilled in the chemical and civil engineering arts. Therefore, the above description and illustrations should not be construed as limiting the scope of the invention, which is defined by the appended claims.

INCORPORATION BY REFERENCE

All of the U.S. patents, U.S. patent application publications, U.S. patent applications, foreign patents, foreign patent applications and non-patent publications referred to in this specification and related filings are incorporated herein by reference in their entirety. All publications, patents, and patent applications mentioned in the specification are indicative of the level of those skilled in the art to which this invention pertains. All publications, patents, and patent applications are herein incorporated by reference to the same extent as if each individual publication or patent application was specifically and individually incorporated by reference. Reference is made to U.S. Pat. Nos. 3,769,781, 3,936,652, 4,099,381 and 9,273,665, and to US Pat. Appl. Nos. 20050150225, 20120121396, 20120240551, 20160084227 for all that is taught.

SCOPE OF CLAIMS

While the above is a complete description of selected embodiments of the present invention, it is possible to practice the invention using various alternatives, modifications, combinations and equivalents.

Having described the invention with reference to the exemplary embodiments, it is to be understood that it is not intended that any limitations or elements describing the exemplary embodiments set forth herein are to be incorporated into the meanings of the patent claims unless such limitations or elements are explicitly listed in the claims. Likewise, it is to be understood that it is not necessary to meet any or all of the identified advantages or objects of the invention disclose herein in order to fall within the scope of any claims, since the invention is defined by the claims and since inherent and/or unforeseen advantages of the present invention may exist even though they may not be explicitly discussed herein. It should further be understood that the application of these techniques are site specific with respect to the geothermal resource, site solar, weather, and general conditions, the site's physical layout and topography, as well as, the site's suitability to thermal chimney cooling systems.

Finally, it is to be understood that it is also within the scope of the invention to provide any computer, computer-system and/or computerized tool as is known by one of ordinary skill in the art that is designed, programmed or otherwise configured to perform any of the above-discussed methods, algorithms or processes for designing and operating a heat engine of the invention.

What is claimed is:

1. A power and freshwater generation plant having a thermal tower or chimney configured for processing geothermal brines, wherein the thermal chimney comprises in combination:
   a) a central airway with surrounding wall, the central airway having a top and a bottom, wherein said bottom is defined by a bottom cold air inlet and said top is defined by a top hot air discharge outlet,
   b) a heat exchanger stack disposed in said central airway, said heat exchanger stack incorporating an organic Rankine Cycle condenser and at least one auxiliary heat exchanger so as to heat the rising air above the cold air inlet temperature, reduce the air mass density, and induce an upward convective air flow by buoyancy force;
   c) above said cold air inlet and heat exchanger stack in said central airway, a geothermal brine evaporator zone such that fresh water from a hot geothermal brine feed and from an auxiliary heater scrubbing solution is evaporated and entrained as water vapor in a high humidity air stream rising convectively up through liquid de-entrainment baffles of said thermal chimney, said air stream having a mass flow, a momentum, and a dew point dependent on the temperature and pressure that approaches full moisture saturation thereof; and, d) proximate to said top, a swirl inducer and condenser zone for receiving said high humidity air stream from said evaporator zone, said condenser zone having inlet guide vanes such that said air stream is funneled through a vortex-generating structure therein, wherein said vortex-generating structure is effective in accelerating and cooling said water vapor below said dew point, thereby forming condensed droplets of fresh water and optionally power.

2. The plant of claim 1, wherein said vortex-generating structure comprises an axial cyclone, said axial cyclone operating to separate said droplets of fresh water for deposit in a receiving channel circumferentially disposed in said thermal chimney.

3. The plant of claim 1, further comprising an elevated storage head tank or pond fluidly connected to said receiving channel, wherein said head tank or pond is enabled to store hydraulic potential energy with respect to the organic Rankine Cycle unit and is configured to operate a hydroturbine operatively disposed in an outlet therefrom, thereby providing on-demand geosolar energy.

4. The plant of claim 1, further comprising an elevated storage head tank or pond, said head tank or pond having one or more fresh water outlets.

5. The apparatus of claim 1, wherein said heat exchanger stack comprises:
   a) a first heat exchanger for receiving a solar boost fluid;
   b) a second heat exchanger for receiving a geothermal brine feed from the Rankine Cycle evaporator discharge, further wherein said first and second heat exchangers are configured as a thermal stack, one atop the other and are thermally coupled therein;
   c) a third heat exchanger fluidly coupled to a working fluid loop from a Rankine Cycle power turbine;
   d) a spray system for discharging a spray of a geothermal brine onto a pan positioned above said thermal stack, whereby fresh water from a hot geothermal brine feed is entrained as water vapor in an air stream rising convectively up said thermal chimney in said central airway; and,
   e) an inlet above the evaporator zone to introduce an output from said auxiliary heater combustion unit so as to mix with the rising evaporator discharge moist air flow.

6. The apparatus of claim 5, wherein said air stream admitted into said condenser zone is at a first dew point higher than a second dew point of said air stream discharged from said axial cyclone and further wherein a collector fluidly attached to said condenser zone and axial cyclone is configured to collect any liquid freshwater in excess of said second dew point.

7. A method for concentrative desalination of a geothermal brine, which comprises operating an apparatus of claim 1.

8. A method for concentrative desalination of a geothermal brine from a supply well of a geothermal field while controlling the temperature and saturation of the brine feed so as to separately collect power, fresh water and a mineral concentrate, which comprises in combination, (a) exchanging heat from a geothermal brine input with a recirculating working fluid in an evaporator—superheater, and driving a Rankine Cycle engine with the vapor therefrom, wherein the Rankine Cycle engine loop is configured with a turbine generator for generating a power output;

(b) thermally contacting the geothermal brine input with a liquid boost stream input, the liquid boost stream input having a heat content for driving increased power output from the Rankine Cycle engine, and discharging a geothermal brine discharge and a liquid boost stream discharge;

(c) providing a thermal chimney as a heat sink, the thermal chimney having a base, a top, and a central airway with surrounding wall, wherein the base is defined by a bottom cool air inlet to the central airway, the top is defined by a heated air outlet from the central airway, and the central airway is configured for conducting an exergy driven air stream rising from the bottom cool air inlet to the top heated air outlet thereof, said rising air stream having a mass flow, a momentum, a dew point, and a relative humidity that is at or about saturation;

(d) providing a stack of heat exchangers at the base of the thermal chimney in the central airway, one for receiving the geothermal brine discharge from the Rankine Cycle engine, one for receiving a liquid boost stream discharge, and one configured at the bottom of the stack as a condenser for receiving and condensing the working fluid from the Rankine Cycle engine when thermally contacted with the rising air stream;

(e) admitting the geothermal brine discharge to the stack of heat exchangers; admitting the liquid boost stream discharge to the stack of heat exchangers; circulating the working fluid through the condenser at the bottom of the stack;

(f) providing an evaporator zone above the stack of heat exchangers, therein fluidly contacting the geothermal brine discharge with the air stream rising in the central airway, and evaporatively cooling the geothermal brine to a temperature below the solubility product of at least one mineral salt dissolved therein, thereby precipitating the mineral as a solid mineral fraction and forming a supernatant discharge;

(g) admitting the rising air stream into a condenser zone proximate to the top of the thermal chimney, the condenser zone having an axial cyclone with inlet guide vanes, and decompressing and cooling the water vapor below the dew point of the airstream therein, thereby forming a fresh water condensate; and, (h) collecting the power output from the Rankine Cycle engine; collecting the fresh water condensate; collecting the solid mineral concentrate; and pumping the supernatant discharge and geothermal brine discharge into a return well in the geothermal field.

9. The method of claim 8, comprising supplying heat to said liquid boost stream in a solar collector and thermally contacting the geothermal brine and liquid boost stream in a boiler so as to heat the geothermal brine above the source temperature of the supply well and extract more power from the Rankine Cycle engine.

10. The method of claim 8, wherein the liquid boost stream is fluidly coupled to an auxiliary combustion chamber and scrubber, and comprising heating the geothermal brine above its well source temperature with a fuel-air combustion mixture so as to extract more power from the Rankine Cycle engine.

11. The method of claim 8, comprising removing carbon dioxide from the auxiliary heater output in a scrubber, the scrubber having a liquid solution, wherein salt concentrate exiting from the scrubber is combined with any geothermal water concentrate for disposal in the return well and wherein moisture laden combustion gas is joined with moist air rising up from the evaporator zone of the thermal chimney.

12. The method of claim 8, wherein the liquid boost stream is fluidly coupled to a solar boost loop and/or an auxiliary heater loop, and heating the geothermal brine above its well source temperature so as to extract more power from the Rankine Cycle engine.

13. The method of claim 12, comprising stacking three heat exchangers as a thermal stack at the bottom of the central airway, the heat exchangers comprising from top to bottom: i) a heat exchanger for receiving the liquid boost stream from said solar collector loop and/or said auxiliary heater loop, ii) a heat exchanger for receiving the geothermal brine discharge from the evaporator, and, iii) a condenser for receiving and condensing the recirculating working fluid of the Rankine Cycle engine.

14. The method of claim 12, comprising operating the solar boost and/or an auxiliary heater loop with Thermanol or a high capacity heat exchange fluid and providing a thermal storage vessel for retaining said heat exchange fluid and redistributing heat input to the plant as needed so as to level power generated according to dips and peaks in a daily load cycle.

15. The method of claim 8, comprising driving a recuperative heat exchange, wherein the superheated turbine vapor discharge is cooled and recuperatively heats the liquid fluid loop before it reenters the Rankine Cycle evaporator is configured to cycle waste heat which would be lost in the condenser back into the Rankine Cycle engine.

16. The method of claim 8, comprising controlling the temperature of the supernatant discharge and geothermal brine discharge in the heat sink before injecting the supernatant into a return well in a geothermal field.

17. The method of claim 16, comprising injecting the geothermal brine back into a source field at a temperature above a critical solubility temperature after removal and recovery of precipitated minerals.

18. The method of claim 8, comprising disposing a spray head assembly and evaporator collector above the thermal stack, contacting the rising airstream exiting the thermal stack, and evaporatively cooling the supernatant discharge.

19. The method of claim 8, comprising precipitating minerals selected from lithium, bromine, calcium, borate, or rare earth salts from the geothermal brine and capturing said minerals in a sediment trap.

\* \* \* \* \*